(12) United States Patent
Yu et al.

(10) Patent No.: US 10,768,939 B2
(45) Date of Patent: Sep. 8, 2020

(54) LOAD/STORE UNIT FOR A PROCESSOR, AND APPLICATIONS THEREOF

(71) Applicant: ARM Finance Overseas Limited, Cambridge (GB)

(72) Inventors: Meng-Bing Yu, San Jose, CA (US); Era K. Nangia, Los Altos, CA (US); Michael Ni, Cupertino, CA (US)

(73) Assignee: ARM Finance Overseas Limited, Cambridge (GB)

( * ) Notice: Subject to any disclaimer, the term of this patent is extended or adjusted under 35 U.S.C. 154(b) by 0 days.

(21) Appl. No.: 16/366,328

(22) Filed: Mar. 27, 2019

(65) Prior Publication Data
US 2019/0220283 A1    Jul. 18, 2019

Related U.S. Application Data

(63) Continuation of application No. 15/918,106, filed on Mar. 12, 2018, now Pat. No. 10,268,481, which is a
(Continued)

(51) Int. Cl.
*G06F 9/30* (2018.01)
*G06F 9/38* (2018.01)

(52) U.S. Cl.
CPC ............ *G06F 9/3826* (2013.01); *G06F 9/383* (2013.01); *G06F 9/384* (2013.01); *G06F 9/3824* (2013.01);
(Continued)

(58) Field of Classification Search
None
See application file for complete search history.

(56) References Cited

U.S. PATENT DOCUMENTS

| 5,091,851 A | 2/1992 | Shelton et al. |
| 5,109,520 A | 4/1992 | Knierim |

(Continued)

FOREIGN PATENT DOCUMENTS

| GB | 2304215 A | 3/1997 |
| GB | 2322718 A | 9/1998 |

(Continued)

OTHER PUBLICATIONS

Analog Devices Inc, "ADSP-21535 Blackfin™ DSP Brochure," 2001, 4 pages.

(Continued)

*Primary Examiner* — Corey S Faherty
(74) *Attorney, Agent, or Firm* — Patterson Thuente Pedersen, P.A.

(57) ABSTRACT

A load/store unit for a processor, and applications thereof. In an embodiment, the load/store unit includes a load/store queue configured to store information and data associated with a particular class of instructions. Data stored in the load/store queue can be bypassed to dependent instructions. When an instruction belonging to The particular class of instructions graduates and the instruction is associated with a cache miss, control logic causes a pointer to be stored in a load/store graduation buffer that points to an entry in the load/store queue associated with the instruction. The load/store graduation buffer ensures that graduated instructions access a shared resource of the load/store unit in program order.

20 Claims, 17 Drawing Sheets

Related U.S. Application Data continuation of application No. 11/529,728, filed on Sep. 29, 2006, now Pat. No. 9,946,547.

(52) U.S. Cl.
CPC ......... *G06F 9/3836* (2013.01); *G06F 9/3855* (2013.01); *G06F 9/3857* (2013.01)

(56) References Cited

U.S. PATENT DOCUMENTS

| | | |
|---|---|---|
| 5,148,538 A | 9/1992 | Celtruda et al. |
| 5,185,871 A | 2/1993 | Frey et al. |
| 5,193,167 A | 3/1993 | Sites et al. |
| 5,325,511 A | 6/1994 | Collins et al. |
| 5,386,527 A | 1/1995 | Bosshart |
| 5,493,523 A | 2/1996 | Huffman |
| 5,493,667 A | 2/1996 | Huck et al. |
| 5,510,934 A | 4/1996 | Brennan et al. |
| 5,526,504 A | 6/1996 | Hsu et al. |
| 5,537,538 A | 7/1996 | Bratt et al. |
| 5,546,545 A | 8/1996 | Rich |
| 5,568,630 A | 10/1996 | Killian et al. |
| 5,572,704 A | 11/1996 | Bratt et al. |
| 5,586,278 A | 12/1996 | Papworth et al. |
| 5,604,909 A | 2/1997 | Joshi et al. |
| 5,604,912 A | 2/1997 | Iadonato et al. |
| 5,606,683 A | 2/1997 | Riordan |
| 5,632,025 A | 5/1997 | Bratt et al. |
| 5,644,742 A | 7/1997 | Shen et al. |
| 5,670,898 A | 9/1997 | Fang |
| 5,678,025 A | 10/1997 | Ghori et al. |
| 5,734,881 A | 3/1998 | White et al. |
| 5,740,402 A | 4/1998 | Bratt et al. |
| 5,752,069 A | 5/1998 | Roberts et al. |
| 5,758,112 A | 5/1998 | Yeager et al. |
| 5,764,999 A | 6/1998 | Wilcox et al. |
| 5,765,037 A | 6/1998 | Morrison et al. |
| 5,781,753 A | 7/1998 | McFarland et al. |
| 5,784,584 A | 7/1998 | Moore et al. |
| 5,799,165 A | 8/1998 | Favor et al. |
| 5,799,167 A | 8/1998 | Lesartre |
| 5,802,339 A | 9/1998 | Sowadsky et al. |
| 5,802,386 A | 9/1998 | Kahle et al. |
| 5,805,913 A | 9/1998 | Guttag et al. |
| 5,809,326 A | 9/1998 | Nogami |
| 5,809,336 A | 9/1998 | Moore et al. |
| 5,822,756 A | 10/1998 | Thome et al. |
| 5,845,323 A | 12/1998 | Roberts et al. |
| 5,848,433 A | 12/1998 | Tran et al. |
| 5,860,104 A | 1/1999 | Witt et al. |
| 5,860,151 A | 1/1999 | Austin et al. |
| 5,864,707 A | 1/1999 | Tran et al. |
| 5,881,257 A | 3/1999 | Glass et al. |
| 5,884,061 A | 3/1999 | Hesson et al. |
| 5,905,881 A | 5/1999 | Tran et al. |
| 5,909,565 A | 6/1999 | Morikawa et al. |
| 5,954,815 A | 9/1999 | Joshi et al. |
| 5,956,752 A | 9/1999 | Mathews |
| 5,961,629 A | 10/1999 | Nguyen et al. |
| 5,966,734 A | 10/1999 | Mohamed et al. |
| 5,974,538 A | 10/1999 | Wilmot, II |
| 5,987,561 A | 11/1999 | Witt et al. |
| 6,044,478 A | 3/2000 | Green |
| 6,058,447 A | 5/2000 | Holst et al. |
| 6,076,159 A | 6/2000 | Fleck et al. |
| 6,079,014 A | 6/2000 | Papworth et al. |
| 6,085,315 A | 7/2000 | Fleck et al. |
| 6,115,792 A | 9/2000 | Tran |
| 6,119,222 A | 9/2000 | Shiell et al. |
| 6,216,200 B1 | 4/2001 | Yeager |
| 6,223,278 B1 | 4/2001 | Morrison |
| 6,247,124 B1 | 6/2001 | Joshi et al. |
| 6,249,862 B1 | 6/2001 | Chinnakonda et al. |
| 6,266,752 B1 | 7/2001 | Witt et al. |
| 6,266,755 B1 | 7/2001 | Yeager |
| 6,266,768 B1 | 7/2001 | Frederick, Jr. et al. |
| 6,269,436 B1 | 7/2001 | Tran et al. |
| 6,279,102 B1 | 8/2001 | Morrison |
| 6,286,130 B1 | 9/2001 | Poulsen et al. |
| 6,289,442 B1 | 9/2001 | Asato |
| 6,298,438 B1 | 10/2001 | Thayer et al. |
| 6,304,960 B1 | 10/2001 | Yeh et al. |
| 6,308,252 B1 | 10/2001 | Agarwal et al. |
| 6,311,261 B1 | 10/2001 | Chamdani, I et al. |
| 6,324,634 B1 | 11/2001 | Yoshioka et al. |
| 6,374,342 B1 | 4/2002 | Sasahara |
| 6,393,550 B1 | 5/2002 | Fetterman et al. |
| 6,418,520 B1 | 7/2002 | Hayakawa et al. |
| 6,425,055 B1 | 7/2002 | Sager et al. |
| 6,430,655 B1 | 8/2002 | Courtright et al. |
| 6,470,445 B1 | 10/2002 | Arnold et al. |
| 6,473,837 B1 | 10/2002 | Hughes et al. |
| 6,477,639 B1 | 11/2002 | Krishnan et al. |
| 6,505,285 B1 | 1/2003 | Rabinovici et al. |
| 6,526,499 B2 * | 2/2003 | Palanca ............... G06F 12/0802 712/23 |
| 6,546,477 B1 | 4/2003 | Russo et al. |
| 6,557,127 B1 | 4/2003 | Adams et al. |
| 6,594,728 B1 | 7/2003 | Yeager |
| 6,598,148 B1 | 7/2003 | Moore et al. |
| 6,678,840 B1 | 1/2004 | Kessler et al. |
| 6,681,295 B1 | 1/2004 | Root et al. |
| 6,687,789 B1 | 2/2004 | Keller et al. |
| 6,691,221 B2 | 2/2004 | Joshi et al. |
| 6,754,804 B1 | 6/2004 | Hudepohl et al. |
| 6,757,817 B1 | 6/2004 | Booth |
| 6,760,835 B1 | 7/2004 | Yu |
| 6,782,445 B1 | 8/2004 | Olgiati et al. |
| 6,836,833 B1 | 12/2004 | Kinter et al. |
| 6,915,395 B1 | 7/2005 | Singh |
| 6,983,234 B1 | 1/2006 | Hangal et al. |
| 7,003,630 B1 | 2/2006 | Kissell |
| 7,032,226 B1 | 4/2006 | Nemirovsky et al. |
| 7,155,440 B1 | 12/2006 | Kronmiller et al. |
| 7,263,599 B2 | 8/2007 | Norden et al. |
| 7,389,403 B1 | 6/2008 | Alpert et al. |
| 7,401,205 B1 | 7/2008 | Dally et al. |
| 7,502,876 B1 | 3/2009 | Nemirovsky et al. |
| 7,594,079 B2 | 9/2009 | Yu et al. |
| 7,805,565 B1 | 9/2010 | Milligan et al. |
| 7,870,369 B1 | 1/2011 | Nelson et al. |
| 8,307,194 B1 | 11/2012 | Scott et al. |
| 8,392,651 B2 | 3/2013 | Mylavarapu |
| 9,092,343 B2 | 7/2015 | Yu et al. |
| 9,632,939 B2 | 4/2017 | Yu et al. |
| 9,946,547 B2 * | 4/2018 | Yu .................... G06F 9/3826 |
| 10,268,481 B2 | 4/2019 | Yu et al. |
| 2001/0056517 A1 | 12/2001 | Hataida et al. |
| 2002/0002666 A1 | 1/2002 | Dulong et al. |
| 2002/0007450 A1 | 1/2002 | Witt et al. |
| 2002/0103991 A1 | 8/2002 | Overkamp et al. |
| 2002/0156962 A1 | 10/2002 | Chopra et al. |
| 2002/0161976 A1 | 10/2002 | Ito et al. |
| 2002/0174322 A1 | 11/2002 | Kruckemyer |
| 2003/0014597 A1 | 1/2003 | Van |
| 2003/0061465 A1 | 3/2003 | Yeh et al. |
| 2003/0074537 A1 | 4/2003 | Pang et al. |
| 2003/0149862 A1 | 8/2003 | Kadambi |
| 2003/0217251 A1 | 11/2003 | Jourdan et al. |
| 2003/0225980 A1 | 12/2003 | Henry et al. |
| 2004/0010782 A1 | 1/2004 | Moritz |
| 2004/0019883 A1 | 1/2004 | Banerjee et al. |
| 2004/0044878 A1 | 3/2004 | Evans et al. |
| 2004/0064682 A1 | 4/2004 | Nguyen et al. |
| 2004/0088526 A1 | 5/2004 | Colavin et al. |
| 2004/0128483 A1 | 7/2004 | Grochowski et al. |
| 2004/0158683 A1 | 8/2004 | Thatipelli et al. |
| 2004/0193858 A1 | 9/2004 | Ahmad et al. |
| 2005/0050277 A1 | 3/2005 | Shen et al. |
| 2005/0050278 A1 | 3/2005 | Meier et al. |
| 2005/0102483 A1 | 5/2005 | Kinter et al. |
| 2005/0125629 A1 | 6/2005 | Kissell |
| 2005/0125795 A1 | 6/2005 | Kissell |
| 2005/0246499 A1 | 11/2005 | Saida et al. |

(56) References Cited

U.S. PATENT DOCUMENTS

| | | |
|---|---|---|
| 2005/0251664 A1 | 11/2005 | Caprioli et al. |
| 2006/0053323 A1 | 3/2006 | Kissell |
| 2006/0090034 A1 | 4/2006 | Ishihara et al. |
| 2006/0095732 A1 | 5/2006 | Tran et al. |
| 2006/0149904 A1 | 7/2006 | Mowry |
| 2006/0259747 A1 | 11/2006 | Gonzalez et al. |
| 2007/0214298 A1 | 9/2007 | Sullivan, Jr. et al. |
| 2008/0005513 A1 | 1/2008 | Lim |
| 2008/0022064 A1 | 1/2008 | Kenkare et al. |
| 2008/0046692 A1 | 2/2008 | Michalak et al. |
| 2008/0059765 A1 | 3/2008 | Svendsen et al. |
| 2008/0059771 A1 | 3/2008 | Svendsen et al. |
| 2008/0065868 A1 | 3/2008 | Banerjee et al. |
| 2008/0082721 A1 | 4/2008 | Yu et al. |
| 2008/0082753 A1 | 4/2008 | Licht et al. |
| 2008/0082793 A1 | 4/2008 | Yu et al. |
| 2008/0082794 A1 | 4/2008 | Yu et al. |
| 2008/0082795 A1 | 4/2008 | Kishore et al. |
| 2008/0126768 A1 | 5/2008 | Nakata |
| 2009/0198900 A1 | 8/2009 | Knoth |
| 2009/0222625 A1 | 9/2009 | Ghosh et al. |
| 2010/0011166 A1 | 1/2010 | Yu et al. |
| 2017/0192894 A1 | 7/2017 | Yu et al. |
| 2018/0203702 A1 | 7/2018 | Yu et al. |

FOREIGN PATENT DOCUMENTS

| | | |
|---|---|---|
| WO | WO-02082278 A1 | 10/2002 |
| WO | WO-2004023292 A2 | 3/2004 |

OTHER PUBLICATIONS

Application and File History for U.S. Appl. No. 11/519,728, filed Sep. 29, 2006, inventors Meng-Bing et al.
Application and File History for U.S. Appl. No. 11/529,710, filed Sep. 29, 2006, inventors Meng-Bing Yu et al.
Application and File History for U.S. Appl. No. 11/545,706, filed Oct. 11, 2006, inventors Meng-Bing Yu et al.
Application and File History for U.S. Appl. No. 12/563,840, filed Sep. 21, 2009, inventors Meng-Bing Yu et al.
Application and File History for U.S. Appl. No. 14/749,932, filed Jun. 25, 2015, inventors Meng-Bing et al.
Application and File History for U.S. Appl. No. 15/467,661, filed Mar. 23, 2017, inventors Yu et al.
Application and File History for U.S. Appl. No. 15/918,106, filed Mar. 12, 2018, inventors Yu et al.
Arvind, et al., "Memory Model=Instruction Reordering+Store Atomicity," ACM SIGARCH Computer Architecture News, vol. 34 (2), May 2006, pp. 29-40.
Banakar R., et al., "Scratchpad Memory.: A Design Alternative for Cache On-Chip Memory in Embedded Systems," ACM, Proceedings of Codes'02, Estes Park, Colorado, May 6-8, 2002, pp. 73-78.
Bellas N., et al., "Architectural and Compiler Techniques for Energy Reduction in High-Performance Microprocessors,"IEEE Transactions on Very Large Scale Integration(VLSI) System, vol. 8 (3), Jun. 2000, pp. 317-326.
Bird P.L., et al., "The Effectiveness of Decoupling," ACM, Proceedings of the 7th International Conference on Supercomputing, 1993, pp. 47-56.
Bratt J.P., U.S. Appl. No. 08/168,094, filed Dec. 15, 1993, entitled "Superscalar Microprocessor Instruction Pipeline Including Instruction Dispatching and Kill Control," 54 pages.
Buti T.N., et al., "Organization and Implementation of the Register-Renaming Mapper for Out-of-Order IBM Power4 Processors," IBM J. Res. & Dev, vol. 49 (1), Jan. 2005, pp. 167-188.
Cotterell S., et al., "Tuning of Loop Cache Architectures to Programs in Embedded System Design," Proceedings of the International Symposium on System Synthesis, Oct. 2-4, 2002, 6 pages.
Dally W.J., et al., U.S. Appl. No. 09/637,500, filed Aug. 11, 2000, entitled "High Performance RISC Instruction Set Digital Signal Processor Having Circular Buffer and Looping Controls," 72 pages.
De Vries, H., "Understanding the detailed Architecture of AMD's 64 bit Core," Retrieved from http://chip-architect.com/news/2003_09_21_Detailed_Architecture_of_AMDs_64bit_Core.html, Sep. 21, 2003, pp. 1-85.
Farkas K.I., et al., "How Useful Are Non-blocking Loads, Stream Buffers, and Speculative Execution in Multiple Issue Processors?," WRL Research Report 94/8, Dec. 1994, 34 pages.
Flynn M.J., et al., "Using Simple Tools to Evaluate Complex Architectural Trade-Offs," IEEE Micro, Jul.-Aug. 2000, pp. 67-75.
Fujitsu Limited., "SPARC64 V Processor for UNIX Server," Revision 1.0, Aug. 2004, pp. 1-24.
Fukuoka K., et al., "Leakage Power Reduction for Clock Gating Scheme on PD-SOI," IEEE Computer Society International Symposium on Circuits and Systems, 2004, pp. 613-616.
Goodman J.R., et al., "Pipe: A VLSI Decoupled Architecture," IEEE, ACM SIGARCH Computer Architecture News, 1985, pp. 20-27.
Gwennap L., "SGI Provides Overview of TFP CPU," Microprocessor Report, vol. 7 (2), Feb. 15, 1993, pp. 1-2.
Gwennap L., "MIPS R10000 Uses Decoupled Architecture High-Performance Core Will Drive MIPS High-End for Years," Microprocessor Report, MicroDesign Resources, vol. 8 (14), Oct. 24, 1994, pp. 1-5.
Gwennap L., "MIPS R12000 to Hit 300 MHz," Microprocessor Report, vol. 11 (13), Oct. 6, 1997, pp. 1-4.
Gwennap L., "MIPS Roadmap Focuses on Bandwidth," Microprocessor Report, May 12, 1997, pp. 1-3.
Gwennap L., "TFP Designed for Tremendous Floating Point," Microprocessor Report, vol. 7 (11), Aug. 23, 1993, pp. 1-5.
Hennessy J.L., et al., "Computer Architecture: A Quantitative Approach," Third Edition, Morgan Kaufmann Publishers, 2003, pp. 608-609.
Hennessy J.L., et al., "Computer Architecture," Third Edition, Morgan Kaufmann Publishers, 2003, pp. A20-A26, A38, D1-D23.
Horowitz M., et al., "Informing Memory Operations: Memory Performance Feedback Mechanisms and Their Applications," ACM Transactions on Computer Systems, vol. 16 (2), May 1998, pp. 170-205.
Intel Architecture Software Developer's Manual, "Instruction Set Reference," Intel Corporation, vol. 2, 1997, pp. 3-278 and 3-279.
Intel Architecture Software Developer's Manual, "Intoduction to the Intel Architecture," vol. 1-3, 1999, pp. 2-7, 2-10, 2-11, 2-12, 3-329, 9-16, A-10, and A-20.
Intel, "Intel StrongARM® SA-1100 Microprocessor," Developer's Manual, Intel Corporation, Aug. 1999, pp. i-xix, 1-1 to 1-7, 2-1 to 2-8 and 6-1 to 6-7.
International Preliminary Report on Patentability for Application No. PCT/US2007/021006, dated Mar. 31, 2009, 4 pages.
International Preliminary Report on Patentability for Application No. PCT/US2007/021007, dated Mar. 31, 2009, 7 pages.
International Search Report and Written Opinion for PCT Application No. PCT/US2007/021006, dated Jul. 31, 2008, 5 pages.
International Search Report and Written Opinion for PCT Application No. PCT/US2007/021007, dated Jul. 2, 2009, 12 pages.
Jeong C.H., et al., "The Design and Implementation of CalmRISC32 Floating Point Unit," The Second IEEE Asia Pacific Conference on ASICs, Aug. 28-30, 2000, pp. 327-330.
Kandemir M., et al., "Dynamic Management of Scratch-Pad Memory Space," Proceedings of the 38th Design Automation Conference, ACM, Jun. 18-22, 2001, pp. 690-695.
Kandemir, M. et al., "Exploiting Scratch Pad Memory Using Presburger Formulas," Proceedings of ISSS 'OJ, ACM, Montreal, Quebec, Canada, Oct. 2001, pp. 7-12.
Kandemir, M. et al., "Exploiting Shared Scratch Pad Memory Space in Embedded Multiprocessor Systems," Proceedings of the 39th Design Automation Conference, ACM, New Orleans, Louisiana, Jun. 10-14, 2002, pp. 219-224.
Kiyohara T., et al., "Register Connection: A New Approach to Adding Registers into Instruction Set Architectures," Proceedings of the International Conference on Computer Architecture, 1993, pp. 247-256.
Krewell, K., "Intel Looks to Core for Success", Microprocessor Report, vol. 20, Mar. 2006, pp. 1, 4, 5 and 6.

(56) References Cited

OTHER PUBLICATIONS

Lee L.H., et al., "Instruction Fetch Energy Reduction Using Loop Caches for Embedded Applications with Small Tight Loops," ISLPED'99, ACM, 1999, pp. 267-269.
Lipasti M.H., et al., "Physical Register Inlining," retrieved from http://pharm.ece.wisc.edu/papers/isca2004_egunadi.pdf, on Jun. 12, 2006, 11 pages.
Merten M.C., et al., "Modulo Schedule Buffers," IEEE, 2001, pp. 138-149.
MIPS Technologies Inc, "Introducing: The MIPS32™ 4Kc™ and MIPS32™ 4Kp™ Processor Cores"Jade","Paper Copy of Slide Presentation Distributed at the Embedded Microprocessor Forum, May 5, 1999, pp. 1-25.
MIPS Technologies Inc, "MIPS R10000 Microprocessor User's Manual," Andes R10000, Revision 2.0, Sep. 19, 1996, 426 pages.
MIPS Technologies, Inc., "MIPS R10000 Microprocessor," User's Manual, Version 2.0, Jan. 29, 1997, 424 pages.
MIPS Technologies Inc, "MIPS32® 74Kf™ Processor Core Datasheet," Revision 01.04, MD00497, Nov. 14, 2008, pp. 1-24.
Motorola Inc, "Advance Information PowerPC™ 604 RISC Microprocessor Technical Summary," IBM Microelectronics, Revision 1, May 1994, pp. 1-31.
Nass R., "Latest DSP's Poised to Drive 3G Revolution," Portable Design, Penn Well Corporation, Fair Lawn, New Jersey, vol. 8 (9), Sep. 2001, pp. 26, 27, 28, 32, and 34.
Nemirovsky M. et al., U.S. Appl. No. 09/602,279, filed Jun. 23, 2000, entitled "Methods and Apparatus for Background Memory Management," 24 pages.
Non-Final Office Action dated Sep. 17, 2010 for U.S. Appl. No. 12/563,840, filed Sep. 21, 2009, 15 pages.
Office Action dated Sep. 16, 2015 for Indian Application No. 1089/KOLNP/2009, 2 pages.
Osborne M., et al., "Superscalar Pipeline Architectures," Slide Presentation, retrieved from http://www.academic.marist.edu/jzbv/architecture/projects2004/Superscalar-Architectures.ppt on Jun. 19, 2007, Published on Apr. 19, 2004, 36 pages.
Panda P.R., et al., "Data Memory Organization and Optimizations in Application-Specific Systems," IEEE Design & Test of Computers, IEEE, May 2001, pp. 56-68.
Panda P.R., et al., "Efficient Utilization of Scratch-Pad Memory in Embedded Processor Applications," IEEE, Proceedings of the European Design & Test Conference ED&TC, 1997, pp. 7-11.
Patterson D.A., et al., "Computer Architecture—A Quantitative Approach," Second Edition, Morgan Kaufman Publishing, 1996, pp. 247 (3 pages).
Peng M.,et al., "Content-Addressable memory (CAM) and its network applications," retrieved from http://www.eetasia.com/ARTICLES/2000MAY/2000MAY03_MEM_NTEK_TAC.PDF, on Jun. 12, 2006, 3 pages.
Pierce J., et al., "Wrong-Path Instruction Prefetching," IEEE Computer Society 29th Int'l. Symp. on Microarchitecture, 1996, pp. 165-175.
Price C., "MIPS R10000 MIPS IV ISA Manual: Andes," Revision 3.2, MIPS Technologies, Inc., Sep. 1995, 323 pages.
Rhodes S., "MIPS R8000 Microprocessor Chip Set," User's Manual, Revision 3.0, Silicon Graphics, Inc., Jul. 1994, 352 pages.
Schmidt D.C., "Transparently Parameterizing Synchronization into a Concurrent Distributed Application: A Case Study of C++ Design Evolution," C++ Report, SIGS Publications, vol. 6 (3), Jul.-Aug. 1994, pp. 1-10.
Shen J.P., et al., "Modern Processor Design: Fundamentals of Superscalar Processors," McGraw-Hill Companies, Inc., Beta Edition, Oct. 9, 2002, 499 pages.
Smith J.E. et al., "The ZS-1 Central Processor," Proceedings of the Second Int'l Conference on Architectural Support for Programming Languages and Operating Systems, IEEE Computer Society Press, Los Alamitos, CA, 1987, pp. 199-204.
Smith J.E., "Retrospective: Decoupled Access/Execute Computer Architectures," 25 Years of the international Symposia on Computer Architecture (Selected Papers), ACM Press, New York, Jun. 1998, pp. 27-28.
Solomon B., et al., "Micro-Operation Cache: A Power Aware Frontend for Variable Instruction Length ISA," Symp. on Low Power Electronics and Design, Aug. 2001, pp. 4-9.
Sung M., et al., "Multithreading Decoupled Architectures for Complexity—Effective General Purpose Computing," ACM SIGARCH Computer Architecture News, ACM Press, New York, vol. 29 (5), Dec. 2001, pp. 56-61.
Taylor M., "The Raw Prototype Design Document," Dept. of Electrical Engineering and Computer Science—Massachusetts Institute of Technology, Nov. 1999, pp. 1, 5, 6, 10 and 53.
VRSeries., "MIPS R10000 Microprocessor," User's Manual: VR10000™ Microprocessor, Version 1.0, NEC, Nov. 1995, 374 pages.
Watts C., et al., "ARM Intelligent Energy Manager Future Evolution," paper copy of slide presentation distributed at the ARM Developers' Conference '04, Oct. 2004, 34 pages.
Woo D.H., et al., "Reducing Energy of Virtual Cache Synonym Lookup Using Bloom Filters," ACM, CASES'06, Oct. 23-25, 2006, pp. 179-189.
Yeager K.C., "The MIPS R10000 Superscalar Microprocessor," IEEE Micro, Apr. 1996, pp. 28-40.

* cited by examiner

| LSQID | \multicolumn{5}{c|}{VTAG} | \multicolumn{4}{c|}{PTAG} | \multicolumn{2}{c|}{DATA INF} | \multicolumn{2}{c|}{EXC INF} |
|---|---|---|---|---|---|---|---|---|---|---|---|---|---|
| | INSTID | TCID | VADD | GRAD | RD | ... | PADD | STATUS | H | HW | ... | DV | DATA | ... | DBG | ... |
| 1 | | | | | | | | | | | | | | | | |
| ... | ... | ... | ... | ... | ... | ... | ... | ... | ... | ... | ... | ... | ... | ... | ... | ... |
| N-1 | | | | | | | | | | | | | | | | |
| N | | | | | | | | | | | | | | | | |

FIG. 3A

| LDQ | | | | | | |
|------|----|----|-------|-------|----|-----|
| DATA | DV | WB | VALID | FSBID | RD | ... |
| | | | | | | |
| ... | ... | ... | ... | ... | ... | ... |
| | | | | | | |
| | | | | | | |

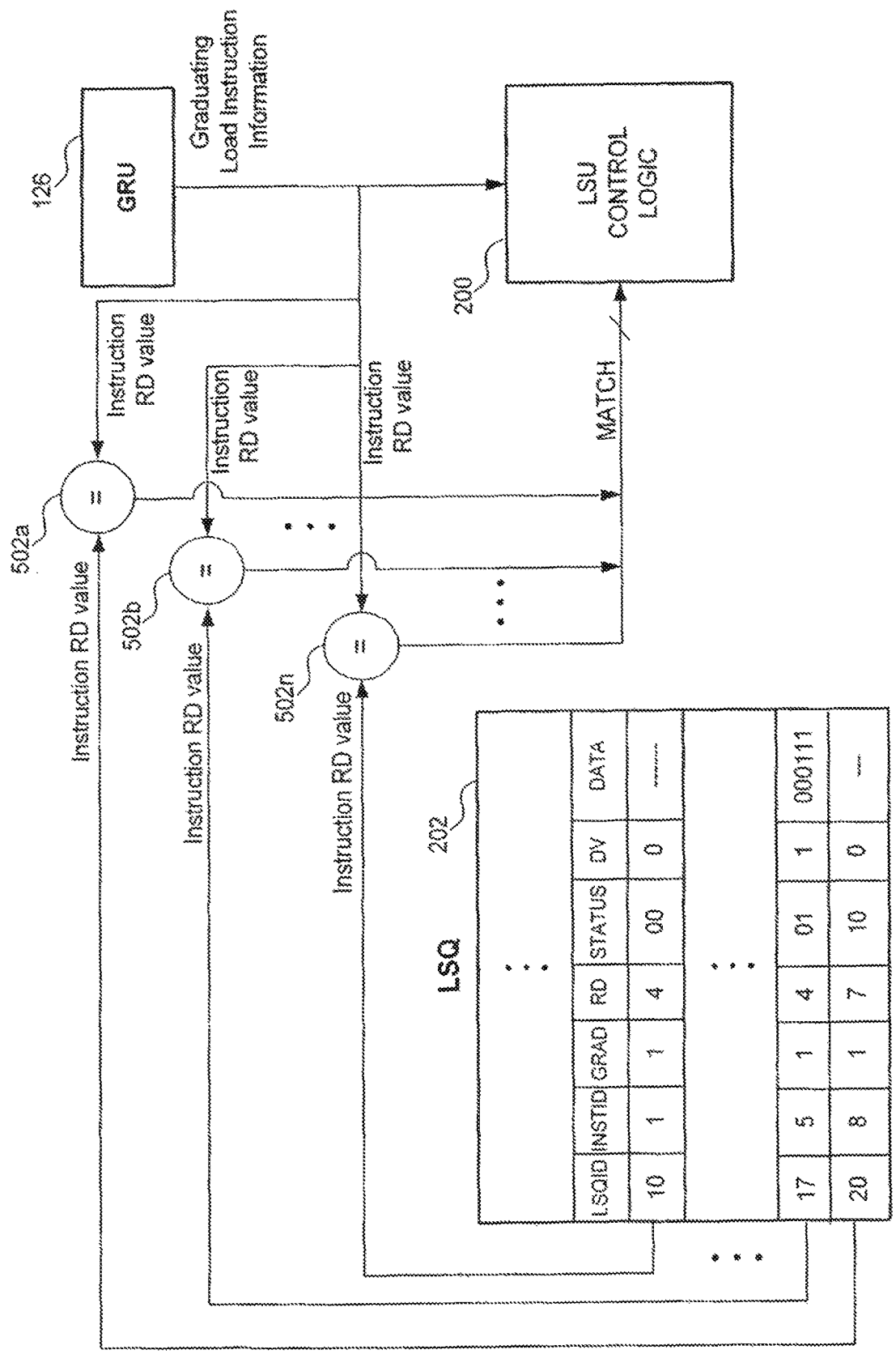
FIG. 5C1

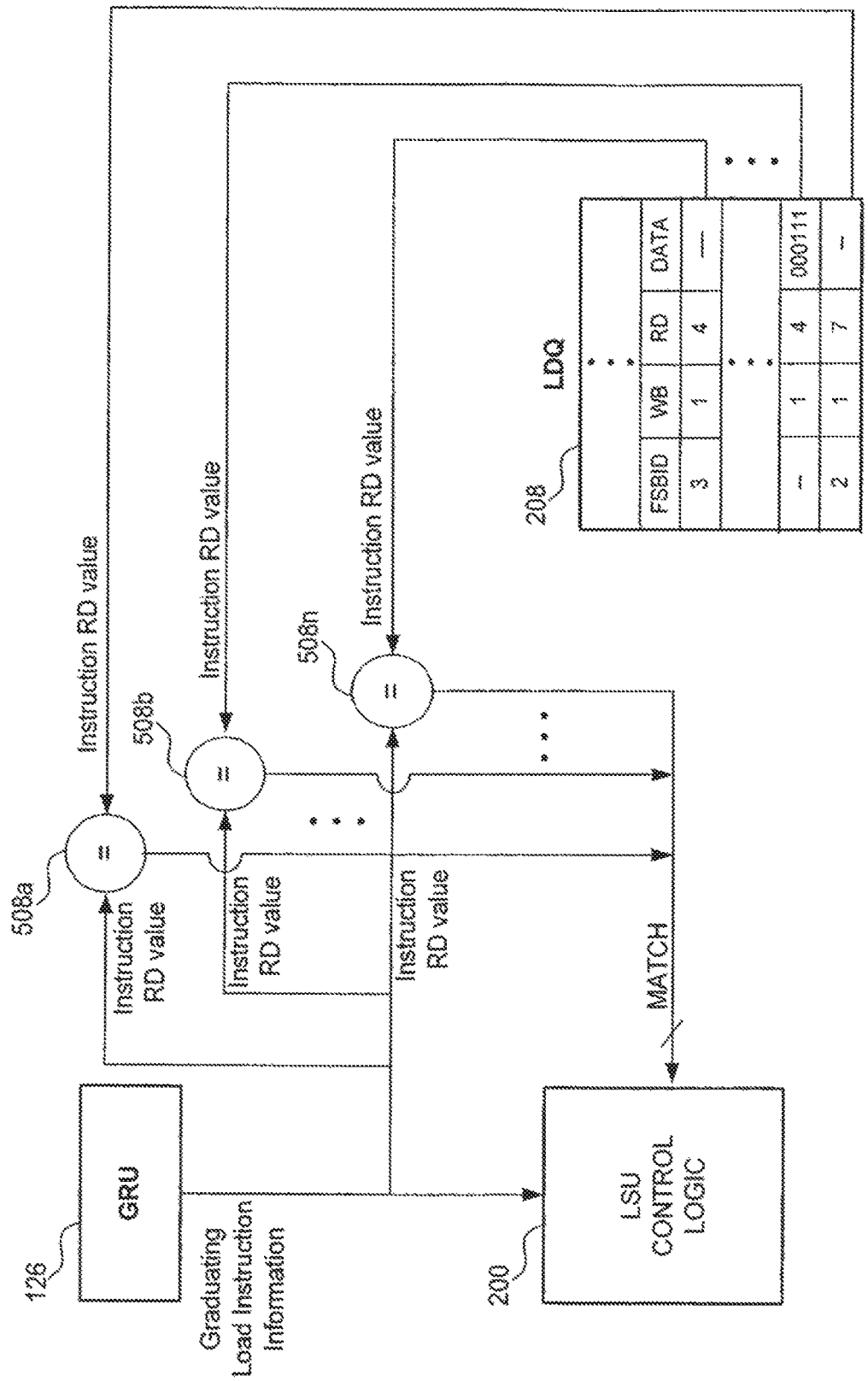
FIG. 5C2

LOAD/STORE UNIT FOR A PROCESSOR, AND APPLICATIONS THEREOF

RELATED APPLICATIONS

This application is a continuation of application Ser. No. 15/918,106 filed Mar. 12, 2018, which in turn is a continuation of application Ser. No. 11/529,728 filed Sep. 29, 2006, now U.S. Pat. No. 9,946,547 issued Apr. 17, 2018, which is hereby fully incorporated herein by reference. Application Ser. No. 11/529,728 is related to commonly owned U.S. Provisional Application No. 60/848,047, titled "Data Cache Virtual Hint Way Prediction, And Applications thereof," filed Sep. 29, 2006, and U.S. application Ser. No. 11/529,710, titled "Detection And Prevention Of Write-After-Write Hazards, And Applications Thereof," filed Sep. 29, 2006, each of which is incorporated herein by reference in its entirety.

FIELD OF THE PRESENT INVENTION

The present invention generally relates to processors.

BACKGROUND OF THE PRESENT INVENTION

Processor pipelining is a known technique used to make processors operate more quickly. This technique enables a processor to work on different steps of an instruction at the same time and thereby take advantage of parallelism that exists among the steps needed to execute an instruction. As a result, a processor can execute more instructions in a shorter period of time.

Many processors, especially those used in the embedded market, are relatively simple in-order machines. As a result, they are subject, for example, to data hazard stalls. More complex processors have out-of-order pipelines, which allow execution of instructions to be scheduled around hazards that would stall an in-order processor pipeline.

What is needed are new techniques and structures for processors that enhance processor performance.

BRIEF SUMMARY OF THE PRESENT INVENTION

The present invention provides a load/store unit for a processor, and applications thereof. In an embodiment, the load/store unit includes a load/store queue configured to store information and data associated with a particular class of instructions. Data stored in the load/store queue can be bypassed to dependent instructions. When an instruction belonging to the particular class of instructions graduates and the instruction is associated with a cache miss, control logic causes a pointer to be stored in a load/store graduation buffer that points to an entry in the load/store queue associated with the instruction. The load/store graduation buffer ensures that graduated instructions access a shared resource of the load/store unit in program order.

Further embodiments, features, and advantages of the present invention, as well as the structure and operation of various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the present invention and to enable a person skilled in the pertinent art to make and use the present invention.

FIG. 3A illustrates an example load/store queue according to an embodiment of the present invention.

FIG. 3B illustrates an example load data queue according to an embodiment of the present invention.

FIG. 5C1 illustrates detection of write-after-write hazards in multiple load entries in a load/store queue.

Figure 2:
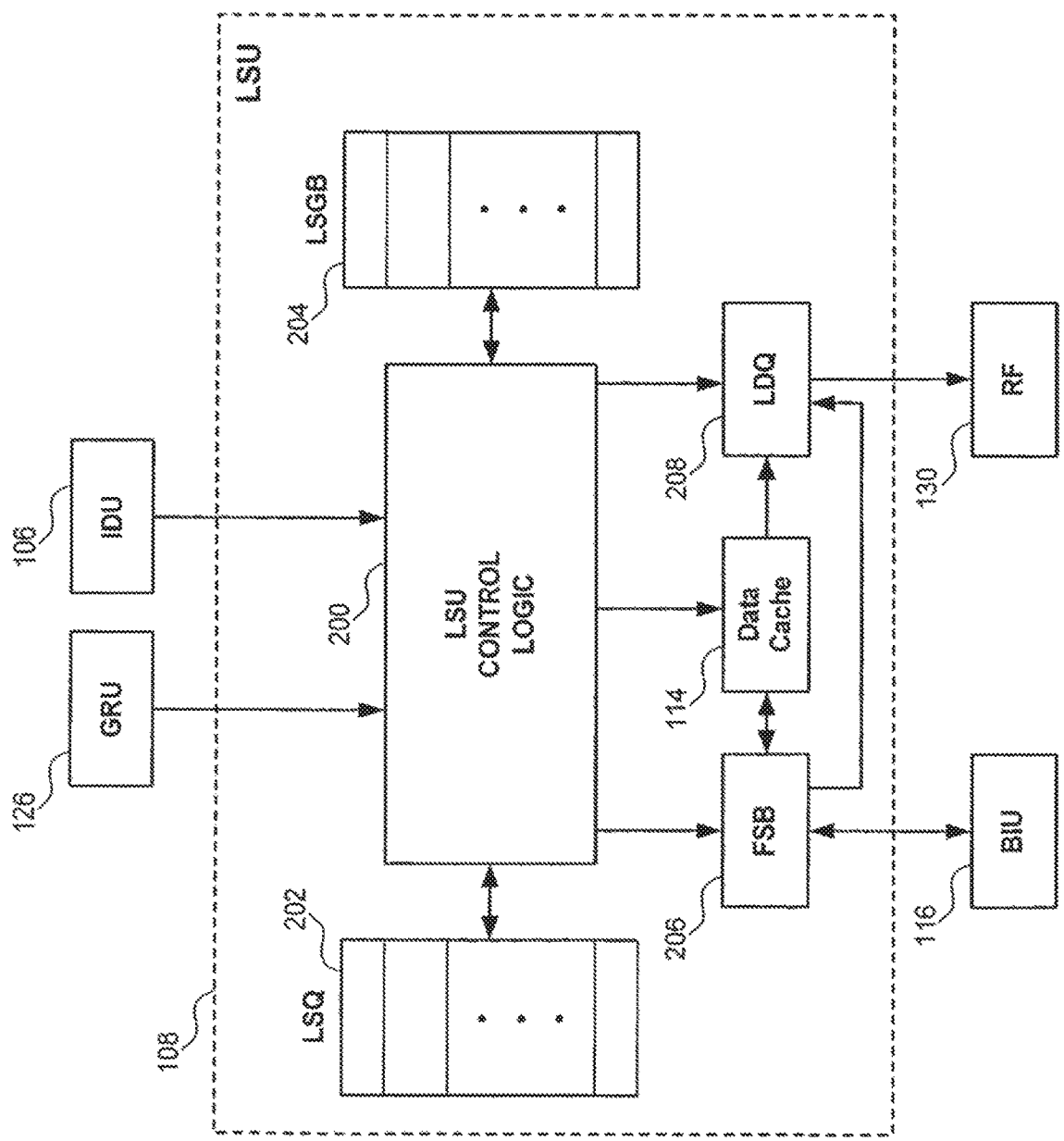
FIG. 2 illustrates an example load/store unit according to an embodiment of the present invention.

FIG. 5C2 illustrates detection of write-after-write hazards in multiple load entries in a load data queue.

Figure 5A:
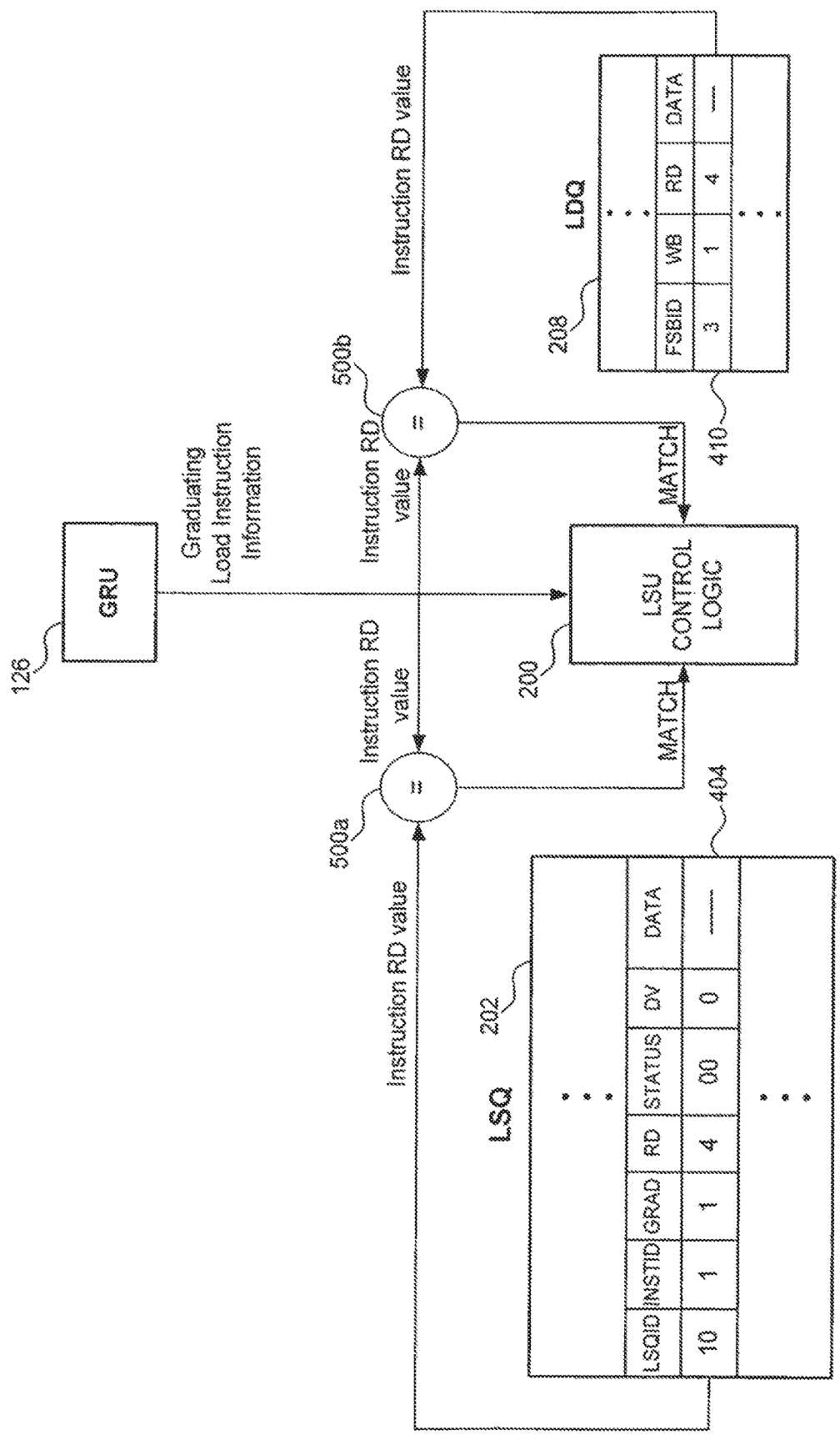
FIG. 5A illustrates detection of a write-after-write hazard according to an embodiment of the present invention.
Figure 5B:
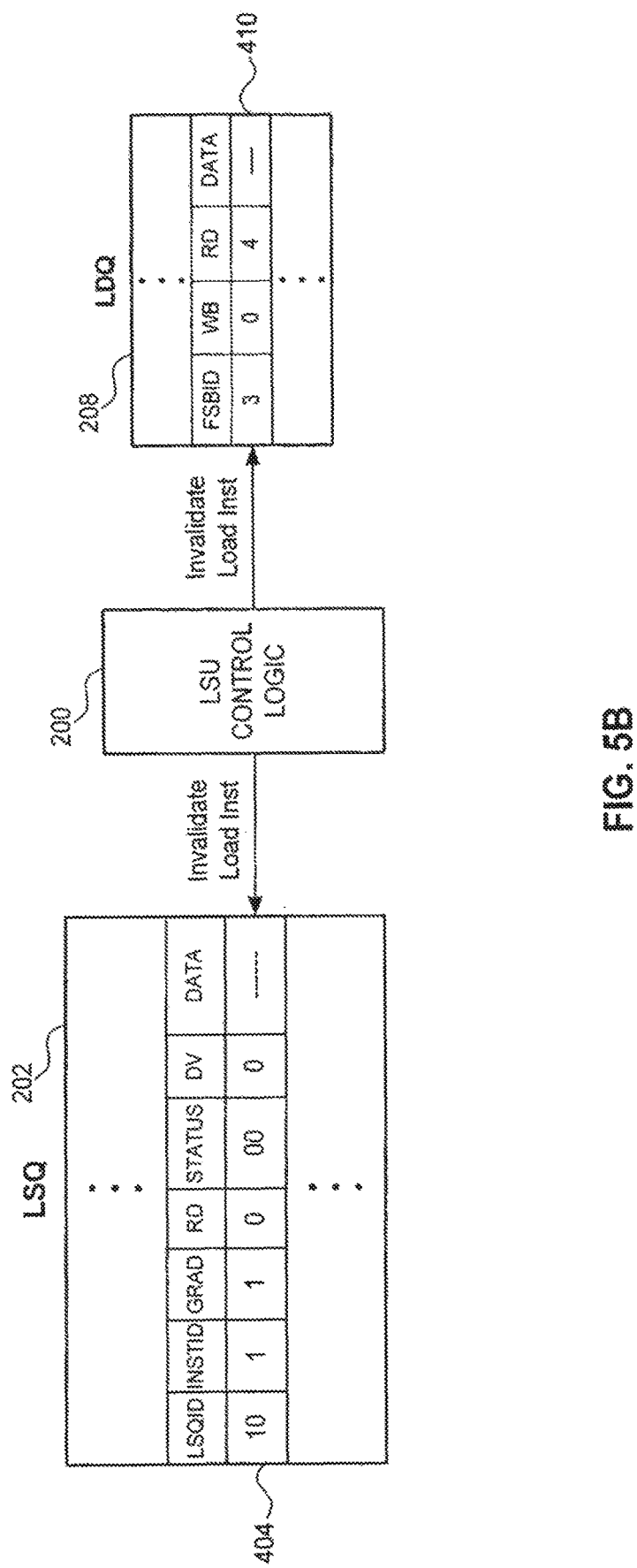
FIG. 5B illustrates prevention of a write-after-write hazard according to an embodiment of the present invention.
Figure 5D:
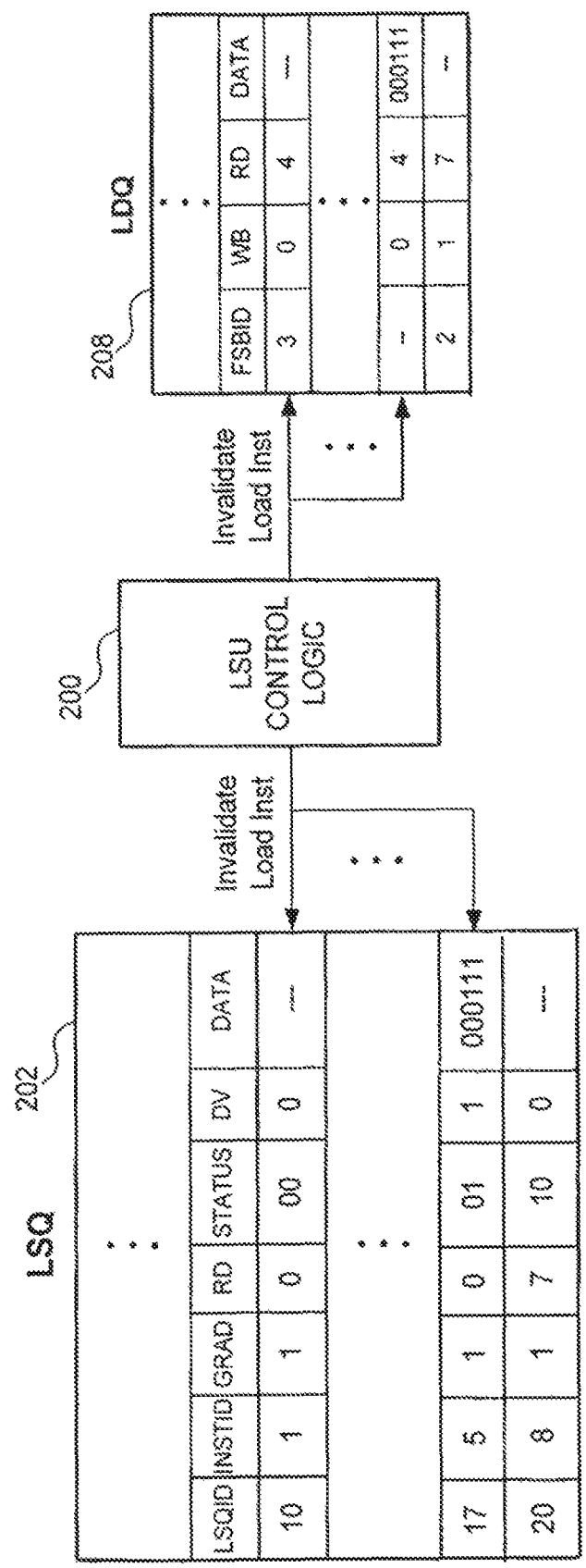

FIG. 5D illustrates prevention of multiple write-after-write hazards according to an embodiment of the present invention.

Figure 6:
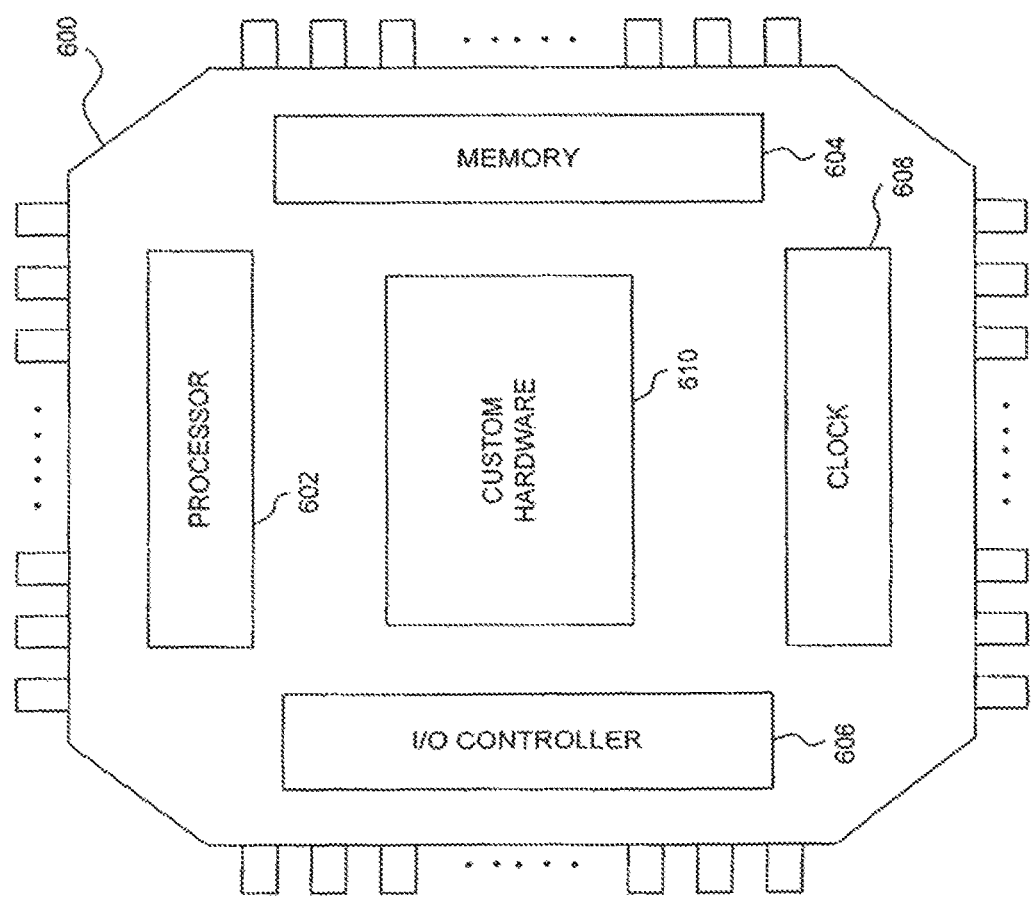

FIG. 6 is a diagram of an example system according to an embodiment of the present invention.

The present invention is described with reference to the accompanying drawings. The drawing in which an element first appears is typically indicated by the leftmost digit or digits in the corresponding reference number.

DETAILED DESCRIPTION OF THE PRESENT INVENTION

The present invention provides a load/store unit for a processor, and applications thereof. In the detailed description of the present invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 1 is a diagram of a processor 100 according to an embodiment of the present invention. Processor 100 preferably implements a load-store, reduced instruction set computer (RISC) architecture. The various components and features of processor 100 illustrated in FIG. 1 are described below.

While processor 100 is described herein as including several separate components, many of these components are optional components that will not be present in each embodiment of the present invention, or components that may be combined, for example, so that the functionality of two components reside within a single component. Thus, the individual components shown for example in FIG. 1 are illustrative and not intended to limit the present invention.

Figure 1A:
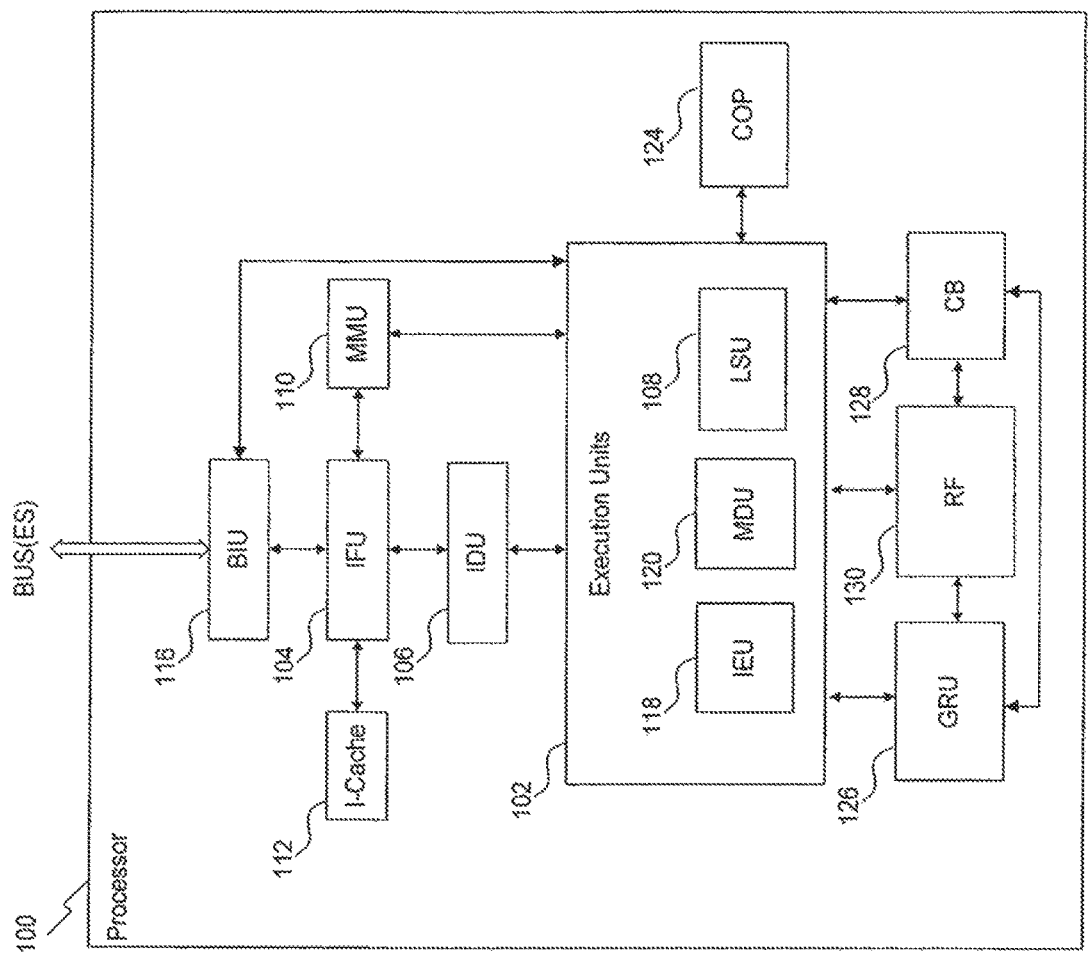
FIG. 1A is a diagram of a processor according to an embodiment of the present invention.

As shown in FIG. 1A, processor 100 includes one or more execution units 102. In an embodiment, execution units 102 include an integer execution unit (IEU) 118 and a load/store unit (LSU) 108. IEU 118 handles arithmetic operations, such as logical operations, shift operations, add operations, and/or subtract operations. LSU 108 handles load/store operations. In a further embodiment, execution units 102 also include, for example, a multiply/divide unit (MDU) 120 to perform multiply and divide operations.

In an embodiment, execution units 102 interact with data stored in 32-bit registers in a register file (RF) 130. In addition, execution units 102 can store data in one or more completion buffers (CB) 128. In an embodiment, a first completion buffer 128 includes 64-bit registers for storing data from integer execution unit 118 and multiply/divide unit 120. A second completion buffer 128 includes 32-bit registers for storing data from load/store unit 108. Optionally, one or more additional register file sets can be included to minimize context switching overhead, for example, during interrupt and/or exception processing.

Execution units 102 interface with an instruction dispatch unit (IDU) 106, a graduation unit (GRU) 126, a memory management unit (MMU) 110, register file 130, completion buffer 128, and an optional coprocessor 124.

Instruction fetch unit (IFU) 104 is responsible for providing instructions to instruction dispatch unit 106. In one embodiment, instruction fetch unit 104 includes control logic for instruction cache 112, an optional recoder for recoding compressed format instructions, an instruction buffer to decouple operation of instruction fetch unit 104 from execution units 102, and an interface to a scratchpad (not shown). In an embodiment, instruction fetch unit 104 performs dynamic branch prediction. Instruction fetch unit 104 interfaces with instruction dispatch unit 106, memory management unit 110, instruction cache 112, and bus interface unit (BIU) 116.

Instruction dispatch unit 106 is responsible for decoding instructions received from instruction fetch unit 104 and dispatching them to execution units 102 when their operands and required resources are available. In an embodiment, instruction dispatch unit 106 may receive up to two instructions in order from instruction fetch unit 104 per cycle. The instructions are assigned an instruction identification value and a completion buffer value (CBID). The completion buffer identification value identifies a buffer location or entry in completion buffer 128 that can be used to hold results temporarily before they are committed to the architectural state of processor 100 by writing the results to register file 130.

Instruction dispatch unit 106 also performs operand renaming to facilitate forwarding of data. Renamed instructions are written into a decoded instruction buffer (DIB) 113 (see FIG. 1B). The oldest instructions stored in the decoded instruction buffer 113 that have all their operands ready and meet all resource requirements are dispatched to an appropriate execution unit for execution. Instructions may be dispatched out-of-program-order to execution units 102. Dispatched instructions do not stall in the execution pipe, and they write their results into completion buffer 128.

In an embodiment, instruction dispatch unit 106 also keeps track of the progress of an instruction through pipeline stages, for example, within execution units 102 and updates the availability of operands in the rename map and in all dependent instructions that are in decoded instruction buffer 113. Instruction dispatch unit 106 also writes the instruction identification, completion buffer identification, and related information values into structures in graduation unit 126.

Load/store unit 108 is responsible for handling load/store instructions to read/write data from data caches and/or memory. Load/store unit 108 is capable of handling loads and stores issued out-of-program-order. Load/Store unit also includes a data cache 114 (see FIG. 1B). Data cache 114 is an on-chip memory array organized as a multi-way set associative cache such as, for example, a 2-way set associative cache or a 4-way set associative cache. Data cache 114 is preferably virtually indexed and physically tagged, thereby allowing virtual-to-physical address translations to occur in parallel with cache accesses.

In an embodiment, load/store unit 108 includes a load/store queue (LSQ) 202 and a load store graduation buffer (LSGB) 204 (see FIG. 2). In an embodiment, load/store queue 202 and load/store graduation buffer 204 have the same number of entries.

Memory management unit 110 translates virtual addresses to physical addresses for memory access. In one embodiment, memory management unit 110 includes a translation lookaside buffer (TLB) and may include a separate instruction TLB and a separate data TLB. Memory management unit 110 interfaces with instruction fetch unit 104 and load/store unit 108.

Instruction cache 112 is an on-chip memory array organized as a multi-way set associative cache such as, for example, a 2-way set associative cache or a 4-way set associative cache. Instruction cache 112 is preferably virtually indexed and physically tagged, thereby allowing virtual-to-physical address translations to occur in parallel with cache accesses. In one embodiment, the tags include a valid bit and optional parity bits in addition to physical address bits. Instruction cache 112 interfaces with instruction fetch unit 104.

Bus interface unit 116 controls external interface signals for processor 100. In one embodiment, bus interface unit 116 includes a collapsing write buffer used to merge write-through transactions and gather writes from uncached stores.

Integer execution unit 118 executes integer instructions. It is capable of handling instructions issued out-of-program order. Integer execution unit 118 includes an arithmetic logic unit for performing arithmetic operations such as add, subtract, shift and logic operations. Integer execution unit 118 interfaces with and operates on data stored in completion buffer 128 and register file 130.

Multiply/divide unit 120 contains a pipeline for integer multiply and divide operations. This pipeline preferably operates in parallel with the integer execution pipeline in integer execution unit 118 and has a separate write port into completion buffer 128. In an embodiment, multiply/divide unit 120 looks ahead and informs instruction dispatch unit 106 that a divide operation is about to complete so that there are no bubbles in the multiply/divide unit pipeline.

Coprocessor 124 couples to execution units 102. In embodiments, coprocessor 124 contains state information used, for example, for identifying and managing exceptions such as external events and/or program errors. In other embodiments, coprocessor 124 is a floating point coprocessor, a graphics coprocessor, or a coprocessor responsible for virtual-to-physical address translation, cache protocols, et cetera. In embodiments, processor 100 includes more than one coprocessor 124.

Graduation unit 126 is responsible for ensuring that instructions graduate and change the architectural state of processor 100 in-program order. Graduation unit 126 also releases buffers and resources used by instructions prior to their graduation.

Figure 1B:
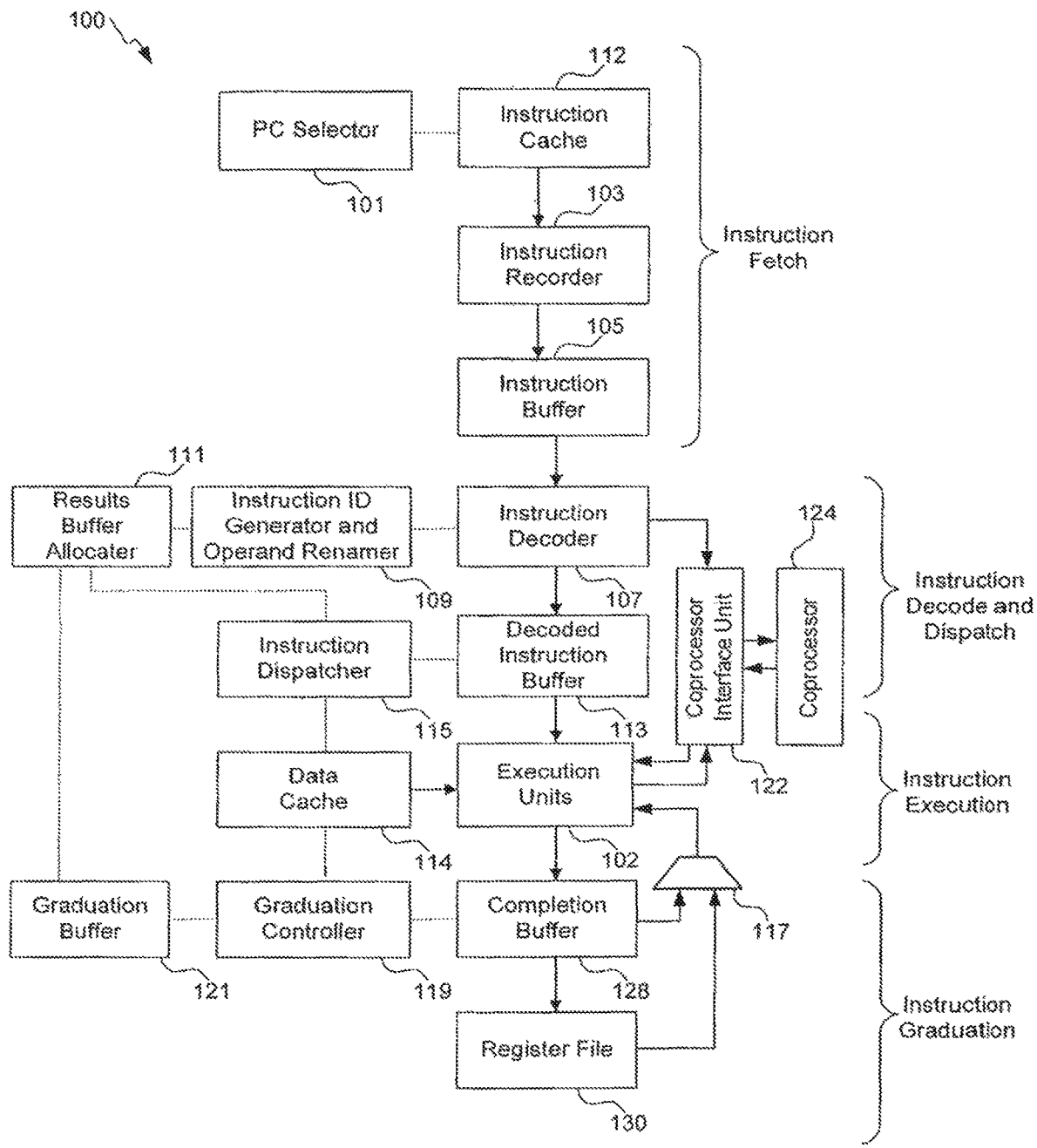
FIG. 1B is a diagram further illustrating the processor of FIG. 1A.

FIG. 1B further illustrates the operation of processor 100. As illustrated in FIG. 1B, processor 100 performs four basic functions: instruction fetch; instruction decode and dispatch; instruction execution; and instruction graduation. These four basic functions are illustrative and not intended to limit the present invention.

Instruction fetch (represented in FIG. 1A by instruction fetch unit 104) begins when a PC selector 101 selects amongst a variety of program counter values and determines a value that is used to fetch an instruction from instruction cache 112. In one embodiment, the program counter value selected is the program counter value of a new program thread, the next sequential program counter value for an existing program thread, or a redirect program counter value associated with a branch instruction or a jump instruction. After each instruction is fetched, PC selector 101 selects a new value for the next instruction to be fetched.

During instruction fetch, tags associated with an instruction to be fetched from instruction cache 112 are checked. In one embodiment, the tags contain precode bits for each instruction indicating instruction type. If these precode bits indicate that an instruction is a control transfer instruction, a branch history table is accessed and used to determine whether the control transfer instruction is likely to branch or likely not to branch.

In one embodiment, any compressed-format instructions that are fetched are recoded by an optional instruction recoder 103 into a format that can be decoded and executed by processor 100. For example, in one embodiment in which processor 100 implements both 16-bit instructions and 32-bit instructions, any 16-bit compressed-format instructions are recoded by instruction recoder 103 to form instructions having 32 bits. In another embodiment, instruction recoder 103 recodes both 16-bit instructions and 32-bit instructions to a format having more than 32 bits.

After optional recoding, instructions are written to an instruction buffer 105. In one embodiment, this stage can be bypassed and instructions can be dispatched directly to an instruction decoder 107.

Instruction decode and dispatch (represented in FIG. 1A by instruction dispatch unit 106) begins, for example, when one or more instructions are received from instruction buffer 105 and decoded by instruction decoder 107. In one embodiment, following resolution of a branch mis-prediction, the ability to receive instructions from instruction buffer 105 may be temporarily halted until selected instructions residing within the instruction execution portion and/or instruction graduation portion of processor 100 are purged.

In parallel with instruction decoding, operands are renamed. Register renaming map(s) located within instruction identification (ID) generator and operand renamer 109 are updated and used to determine whether required source operands are available, for example, in register file 130 and/or a completion buffer 128. A register renaming map is a structure that holds the mapping information between programmer visible architectural registers and internal physical registers of processor 100. Register renaming map(s) indicate whether data is available and where data is available. As will be understood by persons skilled in the relevant arts given the description herein, register renaming is used to remove instruction output dependencies and to ensure that there is a single producer of a given register in processor 100 at any given time. Source registers are renamed so that data is obtained from a producer at the earliest opportunity instead of waiting for the processor's architectural state to be updated.

Also in parallel with instruction decoding, instruction identification (ID) generator and operand renamer 109 generates and assigns an instruction identification tag to each instruction. An instruction identification tag assigned to an instruction is used, for example, to determine the program order of the instruction relative to other instructions. In one embodiment, each instruction identification tag is a thread-specific sequentially generated value that uniquely determines the program order of instructions. The instruction identification tags can be used to facilitate graduating instructions in-program order, which were executed out-of-program order.

Each decoded instruction is assigned a completion buffer identification value or tag by a completion buffer allocater 111. The completion buffer identification value determines the location in completion buffer 128 where instruction execution units 102 can write results for an instruction. In one embodiment, the assignment of completion buffer identification values is accomplished using a free list. The free list contains as many entries as the number of entries in completion buffer 128. The free list can be implemented, for example, using a bitmap. A first bit of the bitmap can be used to indicate whether the completion buffer entry is either available (e.g., if the bit has a value of one) or unavailable (e.g., if the bit has a value of zero).

Assigned completion buffer identification values are written into a graduation buffer 121. In one embodiment, completion buffer completion bits associated with newly renamed instructions are reset/cleared to indicate incomplete results. As instructions complete execution, their corresponding completion buffer completion bits are set, thereby enabling the instructions to graduate and release their associated completion buffer identification values. In one embodiment, control logic (not shown) ensures that one program thread does not consume more than its share of completion buffer entries.

Decoded instructions are written to a decoded instruction buffer 113 if the instructions are to be executed by execution units 102 or to coprocessor interface unit 122 if the instructions are to be executed by a coprocessor 124. An instruction dispatcher 115 selects instructions residing in decoded instruction buffer 113 for dispatch to execution units 102. In embodiments, instructions can be dispatched for execution out-of-program-order to execution units 102. In one embodiment, instructions are selected and dispatched, for example, based on their age (instruction ID tags) assuming that their operands are determined to be ready. In an embodiment, coprocessor 124 executes instructions in-program-order.

Instruction execution units 102 execute instructions as they are dispatched. During execution, operand data is obtained as appropriate from data cache 114, register file 130, and/or completion buffer 128. A result calculated by instruction execution units 102 for a particular instruction is written to a location/entry of completion buffer 128 specified by the instruction's associated completion buffer identification value.

Instruction graduation (represented in FIG. 1A by instruction graduation unit 126) is controlled by a graduation controller 119. Graduation controller 119 graduates instructions in accordance with the completion buffer identification values stored in graduation buffer 121. When an instruction graduates, its associated result is transferred from completion buffer 128 to register file 130. In conjunction with instruction graduation, graduation controller 119 updates, for example, the free list of completion buffer allocater 111 to indicate a change in availability status of the graduating instruction's assigned completion buffer identification value.

FIG. 2 further illustrates load/store unit 108 according to an embodiment of the present invention. Load/store unit 108 preferably includes load/store unit control logic (LSU Control Logic) 200, a load/store queue (LSQ) 202, a load/store graduation buffer (LSGB) 204, a fill/store buffer (FSB) 206, a load data queue (LDQ) 208, and a data cache 114. As shown in FIG. 2, in an embodiment, load/store unit 108 is coupled to instruction dispatch unit 106, graduation unit 126, branch interface unit 116 and register file 130.

Load/store unit 108 can process, for example, 32-bit or 64-bit load instructions and store instructions out-of-program order. In embodiments, load/store unit 108 can handle up to four unique miss requests to branch interface unit 116, support 16 KB, 32 KB and/or 64 KB data cache memory requests, implement a least recently used cache replacement scheme, provide hardware virtual aliasing support, support tag and data parity, and implement virtual tag-based way prediction. These features are implemented with the aid of load/store unit control logic 200.

In embodiments of the present invention, load/store unit control logic 200 controls the allocation and de-allocation of all queues in load/store unit 108. Load/store unit control logic 200 communicates with graduation unit 126, instruction dispatch unit 106, data cache 114, bus interface unit 116 and register file 130. As described in more detail below, load/store unit control logic 200 prevents write-after-write hazards in processor 100, for example, by storing register destination values associated with load instructions in load/store queue 202 and/or load data queue 208, comparing the register destination value of a graduating load instruction with values stored in load/store queue 202 and/or load data queue 208, and preventing any previously graduated load instructions associated with cache misses from altering an architectural state of the processor if they write to the same destination register as the graduating load instruction.

Load/store queue 202 holds address values, status values, and data for a particular class of instruction such as, for example, load and store instructions and memory access instructions that are executed by load/store unit 108. Data stored in load/store queue 202 can be bypassed to dependent instructions using load/store unit control logic 200. In embodiments, information for instructions executed by load/store unit 108, including graduated load/store instructions, is maintained in load/store queue 202 until the instructions complete or the information for the instructions is moved to another resource of load/store unit 108 such as fill/store buffer 206 and/or load data queue 208.

Load/store graduation buffer 204 is preferably a first-in-first-out buffer used for tracking graduated instructions executed by load/store unit 108. Load/store graduation buffer 204 ensures that instructions executed by load/store unit 108 access a shared resource of load/store unit 108 in program order. In an embodiment, load/store graduation buffer 204 has the same number of entries as load/store queue 202. In one embodiment, the number of entries is fourteen.

Fill/store buffer 206 is used to handle memory read requests. In an embodiment, fill/store buffer 206 handles up to four unique miss requests to bus interface unit 116. Each request to bus interface unit 116 requires a possible eviction, followed by a fill of returning data. Fill/store buffer 206 stores data associated with graduated store instructions that missed until the data is filled into data cache 114. Fill/store buffer 206 is capable of merging store data from multiple store misses with returning data. Fill/store buffer 206 is also a bypass point for load data values. Data from fill/store buffer 206, load/store queue 202, or a scratchpad random access memory (not shown) can be merged together and bypassed. In an embodiment, this merging occurs at byte granularity.

Load data queue 208 is used to manage the return of outstanding load misses. In an embodiment, load data queue 208 is four entries deep. When a load data queue request is fulfilled, load data queue 208 arbitrates with graduation unit 126 for access to register file 130.

Data cache 114 is preferably an on-chip memory array organized as a multi-way set associative cache such as, for example, a 2-way set associative cache or a 4-way set associative cache. Data cache 114 is virtually indexed and physically tagged, thereby allowing virtual-to-physical address translations to occur in parallel with cache access.

In operation, instructions can be issued to load/store unit 108 out-of-program-order from decoded instruction buffer 113. Issued instructions are allocated an entry in load/store queue 202. In an embodiment, load/store unit control logic 200 allocates load/store queue 202 entries based on a completion buffer identification value (CBID) assigned to an instruction by instruction dispatch unit 106.

When an issued instruction is received by load/store unit 108, load/store unit control logic 200 determines instruction type, and a virtual address for the instruction, if applicable, is calculated. The virtual address is stored in load/store queue 202. Load/store queue 202 also stores status information and data for each instruction. This status information includes, for example, whether a load or a store instruction is a hit or a miss.

Load/store unit control logic 200 arbitrates for access to data cache 114. Data cache 114 and tag information are read, and the information stored in load/store queue 202. Loads and stores that hit in data cache 114, update a way select line 324 (see FIG. 3E) of data cache 114. In an embodiment, each tag line 320 of data cache 114 contains both a physical address tag and a virtual address tag (a virtual hint). The virtual address tag is used to generate an early cache way prediction that is backed up in a subsequent processor clock cycle with a physical address compare, and a load miss/hit signal, based on the comparison, is provided to execution units 102 and graduation unit 126 so that any dependent instructions can be replayed, if necessary. Data residing in load/store queue 202, fill/store buffer 206, data cache 114 and/or a scratchpad random access memory can be selected based on a virtual address and bypassed if available. In an embodiment, data from load/store queue 202 has the highest priority to be selected and bypassed, followed in order by data from fill/store buffer 206, data from data cache 114, and data from the scratchpad random access memory. Partial data from load/store queue 202 may also be combined with data from fill/store buffer 206 and bypassed to one or more pipeline stages of processor 100.

In embodiments, after available data is bypassed to dependent instructions, any resulting exceptions are prioritized. Load/store unit control logic 200 writes exception information and load hit data into completion buffer 128.

Imprecise exceptions are logged into load/store queue 202 and are signaled to graduation unit 126 when the associated instructions graduate.

In an embodiment, graduation unit 126 can graduate up to two load/store instructions per cycle. Upon receiving an indication from graduation unit 126 to graduate an instruction, load/store unit control logic 200 determines whether the graduating instruction is associated with a cache hit or a cache miss based on status information for the instruction stored in load/store queue 202. If the instruction is a load instruction, and if the status information indicates the instruction is associated with a hit, the entry in load/store queue 202 associated with the graduating instruction is de-allocated. The graduating instruction completes, and if applicable the instruction's result is permitted to change the architectural state of processor 100. If the graduating instruction is associated with a miss, an entry for the graduating instruction is allocated in load/store graduation buffer 204. In an embodiment, the entry in load/store graduation buffer 204 stores a pointer to the entry in load/store queue 202 associated with the graduating instruction. As described in more detail below, information stored in load/store queue 202 associated with an instruction that misses is eventually transferred to fill/store buffer 206 and/or load data queue 208 in order to release the load/store queue 202 entry for use by other instructions.

As noted above, load/store graduation buffer 204 is preferably a first-in-first-out buffer (queue), and thus it processes stored entries in graduation or program order. When an entry reaches the top of load/store graduation buffer 204, the corresponding entry pointed to in load/store queue 202 is checked by load/store unit control logic 200 to determine whether the associated instruction is still a miss or whether the needed data has been returned, for example, from main memory and is available in fill/store buffer 206 or in data cache 114. If the needed data is available, the data is accessed and the entries in load/store queue 202 and load/store graduation buffer 204 are de-allocated. If the needed data is not yet available, load/store unit control logic 200 allocates an entry in fill/store buffer 206 and/or load data queue 208, and the corresponding entry in load/store queue 202 is de-allocated.

Load misses that require memory access via bus interface unit 116 are allocated an entry in both fill/store buffer 206 and load data queue 208. Fill/store buffer 206 is responsible for requesting data from bus interface unit 116 and for forwarding data received via bus interface unit 116 to load data queue 208. Load misses that have a hit in data cache 114 by the time they are serviced by load/store graduation buffer 204 do not require allocation of an entry in fill/store buffer 206. For such cases, an entry is allocated in load data queue 208 and a probe is sent by load/store unit control logic 200 to data cache 114 to retrieve the needed data. When the needed data is returned to load data queue 208, load data queue 208 arbitrates for control of register file 130 and writes the data to a register in register file 130.

As described herein, it is a feature of the present invention that it detects and prevents write-after-write hazards. A write-after-write hazard occurs when a first load instruction misses and a second load instruction hits, wherein the second load instruction follows the first load instruction in program order and both load instructions write to the same destination register. In this scenario, the second (hit) load instruction will write its data to the destination register before the first (miss) load instruction. If not prevented, when the data for the first (miss) instruction returns from memory, the first load instruction will overwrite the data written by the second load instruction, thereby resulting in a write-after-write data hazard. The present invention detects this hazard and prevents the first load instruction from writing to the common register. In an embodiment of the present invention, load/store unit control logic 200 prevents the first load instruction from writing to the common destination register by setting bits in a register destination field in load/store queue 202 associated with the first load instruction that cause the first load instruction to write its data to a read-only register (e.g., register file 130 register R0, which in an embodiment is a read-only register that always returns a value of zero). In an embodiment, if the first load instruction has been allocated an entry in load data queue 208, the first load instruction can be prevented from writing to the common destination register by setting a write-back bit (e.g., to a value zero) in the entry of load data queue 208 corresponding to the first load instruction.

FIG. 3A illustrates an example load/store queue 202 according to an embodiment of the present invention. As shown in FIG. 3A, load/store queue 202 is an N-entry memory structure. In one embodiment, load/store queue 202 is a 14-entry memory structure. Each entry is configured to store a load store queue identification (LSQID) value 300, virtual tag (VTAG) information 302, physical tag (PTAG) information 304, data information (DATA INF) 306, and exception information (EXC INF) 308. Load/store queue 202 preferably includes multiple read ports and multiple write ports to read and write the information described.

The load/store queue identification value 300 is preferably assigned based on an instruction's completion buffer identification value. In an embodiment, the load/store queue identification value 300 is the same as the completion buffer identification value assigned by during instruction decode and dispatch. In another embodiment, there is a one-to-one correspondence between the load/store queue identification value 300 and completion buffer identification value assigned by during instruction decode and dispatch such that a part of the completion buffer identification value is used as load/store queue identification value 300 (e.g., a certain number of the least significant bits of the completion buffer identification value can be used as load/store queue identification value 300).

Virtual tag information 302 includes several status values relating to an instruction. These status values are used, for example, to bypass data to dependent load instructions, to allocate load/store unit 108 resources, and to prevent write-after-write hazards. In an embodiment, the status values included in virtual tag information 302 include (but are not limited to) an instruction identification (INSTID) value, a thread context identification (TCID) value, a virtual address (VADD) value, a graduation (GRAD) value, and a register destination (RD) value. Other values may also be included. The instruction identification value is used to indicate the "age" or program order of an instruction. The thread context identification value identifies a program thread to which an instruction belongs. The virtual address value is the virtual address of an instruction. In embodiments, the virtual address bits stored in load/store queue 108 may be less than all of the virtual address bits (e.g., some least significant bits may be omitted). The graduation value indicates whether the instruction has graduated. In an embodiment, the graduation value is set to one upon receiving a graduation broadcast for an associated instruction from graduation unit 126. The register destination value is used, for example, to indicate where a load instruction value is to be written in register file 130.

Physical tag information 304 includes a physical address (PADD) value, a status (STATUS) value, a homonym (H) value, and a hit-way (HW) value. In embodiments, the physical address bits stored in load/store queue 108 may be less than all of the physical address bits (e.g., some least significant bits may be omitted). The status value is used to indicate the status of an associated cache line. In an embodiment, the status value encodes whether an associated cache line is present in data cache 114 and whether data has been bypassed, for example, in the case of a load instruction. The homonym value of physical tag information 304 indicates that a virtual homonym exists (i.e., a case in which one virtual address maps to two physical addresses). The hit-way value identifies in which cache way an associated cache line exists. On a cache line fill, the hit-way value is updated to reflect the way to which the cache line was written.

In embodiments of the present invention, physical tag information 304 is read, for example, to make a miss/hit determination, when a pointer to an instruction reaches the top of load/store graduation buffer 204 in order to make resource allocation determinations, and to obtain cache line status updates. Physical tag information 304 is written, for example, during cache line fills and evictions.

Data information 306 includes a data valid (DV) value and a data (DATA) value. The data valid value indicates whether the data value is valid. An optional parity value for the data value can also be included. In an embodiment, the data value stored in load/store queue 202 is a double word (e.g., 64 bits) of data.

Exception information 308 includes, for example, a debug exception (DBG) value. Other exception values can also be included. In an embodiment, exception information 308 stores exception specific information that needs to be transferred to a coprocessor register when the associated exception is taken.

Load/store unit control logic 200 controls the allocation and de-allocation of entries in load/store queue 202. In embodiments, load/store queue 202 can be flushed on a per thread basis and compacted to remove flushed out entries. The thread context identification value of virtual tag information 302 is used to support this functionality. When graduation unit 126 encounters a pipe flush condition, the thread context identification value is broadcasted to load/store unit 108 along with an instruction kill signal. In response, load/store queue 202 flushes all un-graduated load store queue entries for the thread.

Figure 3B:
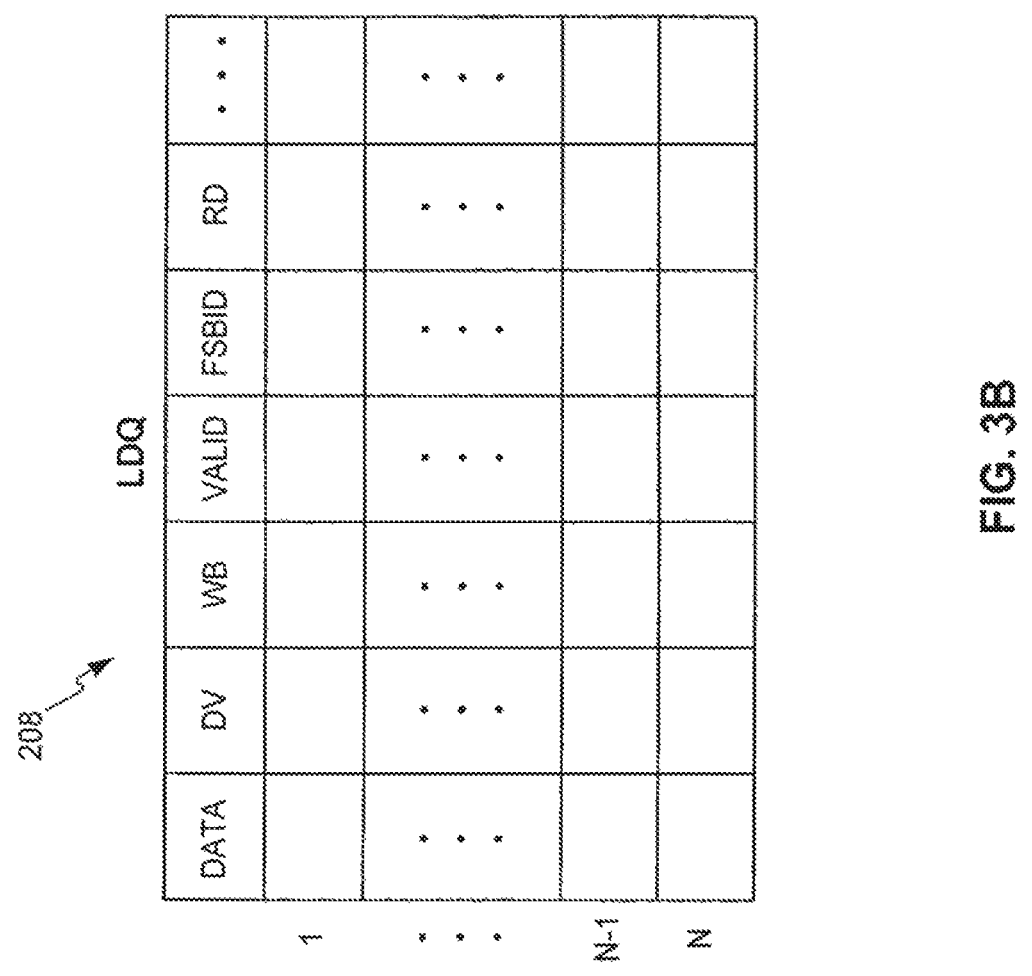

FIG. 3B illustrates an example load data queue (LDQ) 208 according to an embodiment of the present invention. Load data queue 208 is an N-entry memory structure. In an embodiment, load data queue 208 is a 4-entry memory structure. Each entry in load data queue 208 is configured to store a data (DATA) value, a data valid (DV) value, a write-back (WB) value, a valid information (VALID) value, a fill/store buffer identification (FSBID) value, and a register destination (RD) value. As described herein, in an embodiment, the write-back value of load data queue 208 can be used to prevent a write-after-write hazard. This is accomplished, for example, by setting the write-back value to zero, thereby precluding load data queue 208 from writing data to register file 130 after requested data returns.

Load data queue 208 holds information for outstanding load instructions and returns data for an instruction to a register specified by the register destination field of load data queue 208 upon return of data. In an embodiment, the data can come from bus interface unit 116 (e.g., for a load miss), fill/store buffer 206 (e.g., for a data cache miss that hits in fill/store buffer 206), or data cache 114 (e.g., a miss to a hit case). An entry is allocated for an instruction associated with a miss when it reaches the top of load/store graduation buffer 204.

In an embodiment, the entries of load data queue 208 arbitrate one at a time (e.g., in turn) for access to return data back to register file 130. An access request can be made as soon as data is available. Because the data in load data queue 208 is address based, data will go through an aligner before the data is sent to register file 130. If the size of the data is double word, the double word data will be place in a 64 bit data entry. If size of the data is a word or less, the data will be placed in the lower word (e.g., bits 0 to 31) of a data entry. In an embodiment, data can be merged in the load data queue aligner in response to an appropriate instruction to fill the upper data word.

Load/store unit control logic 200 controls allocation and de-allocation of entries in load data queue 208. In embodiments, load data queue 208 can be flushed on a per thread basis and compacted to remove flushed out entries. A thread context identification value is used to support this functionality.

Figure 3C:
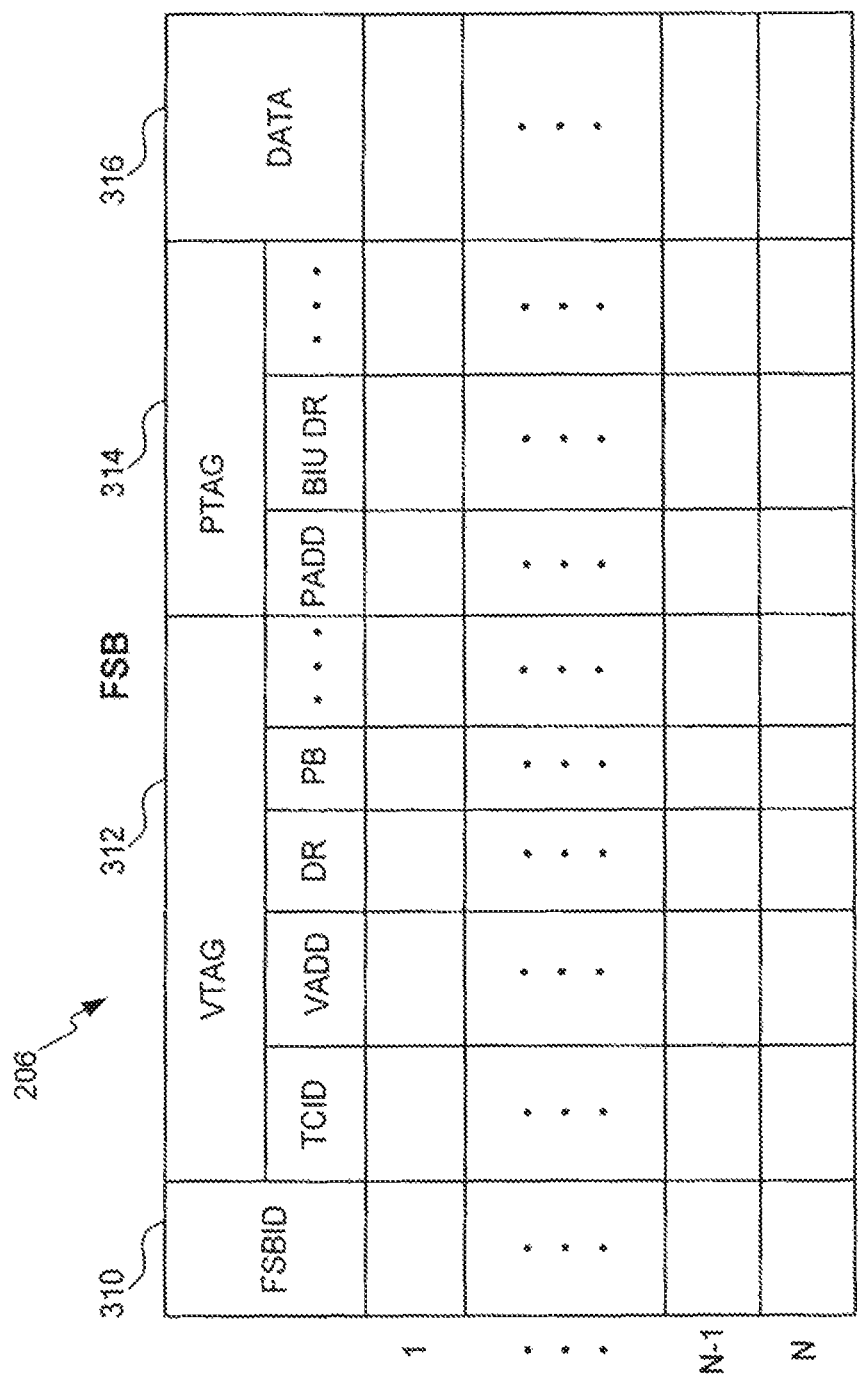
FIG. 3C illustrates an example fill/store buffer according to an embodiment of the present invention.

FIG. 3C illustrates an example fill/store buffer (FSB) 206 according to an embodiment of the present invention. Fill/store buffer 206 is an N-entry memory structure. In an embodiment, fill/store buffer 206 has four entries. Each entry in fill/store buffer 206 is configured to store a fill/store buffer identification (FSBID) value 310, virtual tag (VTAG) information 312, physical tag (PTAG) information 314, and data (DATA) 316. Virtual tag information 312 includes (but is not limited to) a thread context identification (TCID) value, a virtual address (VADD) value, a data request (DR) value, and a data cache probe request (PB) value. Physical tag information 314 includes a physical address (PADD) value, and a bus interface unit data returned (BIU DR) value.

A fill/store buffer 206 entry may be allocated due to a load or store cache miss and cache operations. Each entry holds outstanding line, store data and information pertaining to cache operations. Fill/store buffer 206 forwards data to the cache (fill), to a load/store unit 108 pipeline stage (load, fill/store buffer 206 hit), and to the load data queue 208 (load miss with partial fill/store buffer 206 hit or load miss without forwarding data). Fill/store buffer 206 takes the store data and merges with bus interface unit 116 return data and forwards the line to data cache 114 before the fill completes. Fill/store buffer 206 stores information to perform cache operations. The allocation of virtual addresses and physical addresses does not occur in the same processor cycle, and in an embodiment, the physical address is allocated a couple of cycles after the virtual address. The retiring of a physical address also occurs, for example, a couple of cycles later than the retiring of a virtual address in an entry of fill/store buffer 206.

Load/store unit control logic 200 controls allocation and de-allocation of entries in fill/store buffer 206. In embodiments, fill/store buffer 206 can be flushed on a per thread basis and compacted to remove flushed out entries, for example, using load/store unit control logic 200. A thread context identification value is used to support this functionality.

Figure 3D:
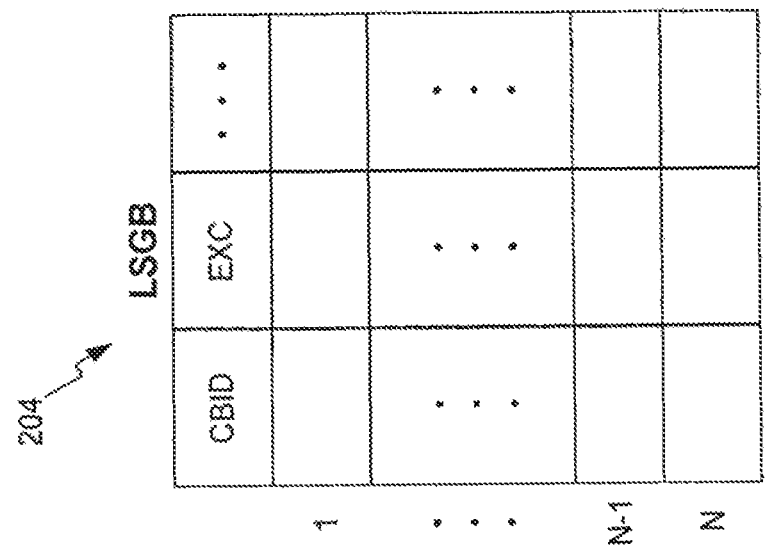
FIG. 3D illustrates an example load/store graduation buffer according to an embodiment of the present invention.

FIG. 3D illustrates an example load/store graduation buffer (LSGB) 204 according to an embodiment of the present invention. Load/store graduation buffer 204 is an N-entry memory structure. Load/store graduation buffer 204 preferably has the same number of entries as entries of completion buffer 128 that are available to be assigned to instructions executed by load/store unit 108. For example, in one embodiment, 14 entries of completion buffer 128 are dedicated for use by load/store unit 108. Thus in this example, load/store graduation buffer 204 also has 14 entries. Each entry in load/store graduation buffer 204 is configured to store a load/store queue identification (LSQID) value and exception information (EXC INF).

Load/store graduation buffer 204 is preferably a circular first-in-first-out (FIFO) buffer. Load/store graduation buffer 204 is used to keep track of load/store instructions past instruction graduation. Entries in load/store graduation buffer 204 are allocated and retired in program order. As described herein, each load/store graduation buffer 204 entry contains a pointer to an entry of load/store queue 202 that is associated with a graduated instruction.

In an embodiment, load/store graduation buffer 204 retires up to two entries in a cycle. Instructions associated with pointers stored in load/store graduation buffer are retired when their pointers reach the top of load/store graduation buffer 204. Upon retiring load and store instructions, load/store graduation buffer 204 releases the completion buffer identification values associated with these instructions. This frees up the corresponding completion buffer entries for reallocation.

Load/store unit control logic 200 controls allocation and de-allocation of entries in load/store graduation buffer 204. In embodiments, load/store graduation buffer 204 can be flushed on a per thread basis and compacted to remove flushed out entries. A thread context identification value is used to support this functionality.

Figure 3E:
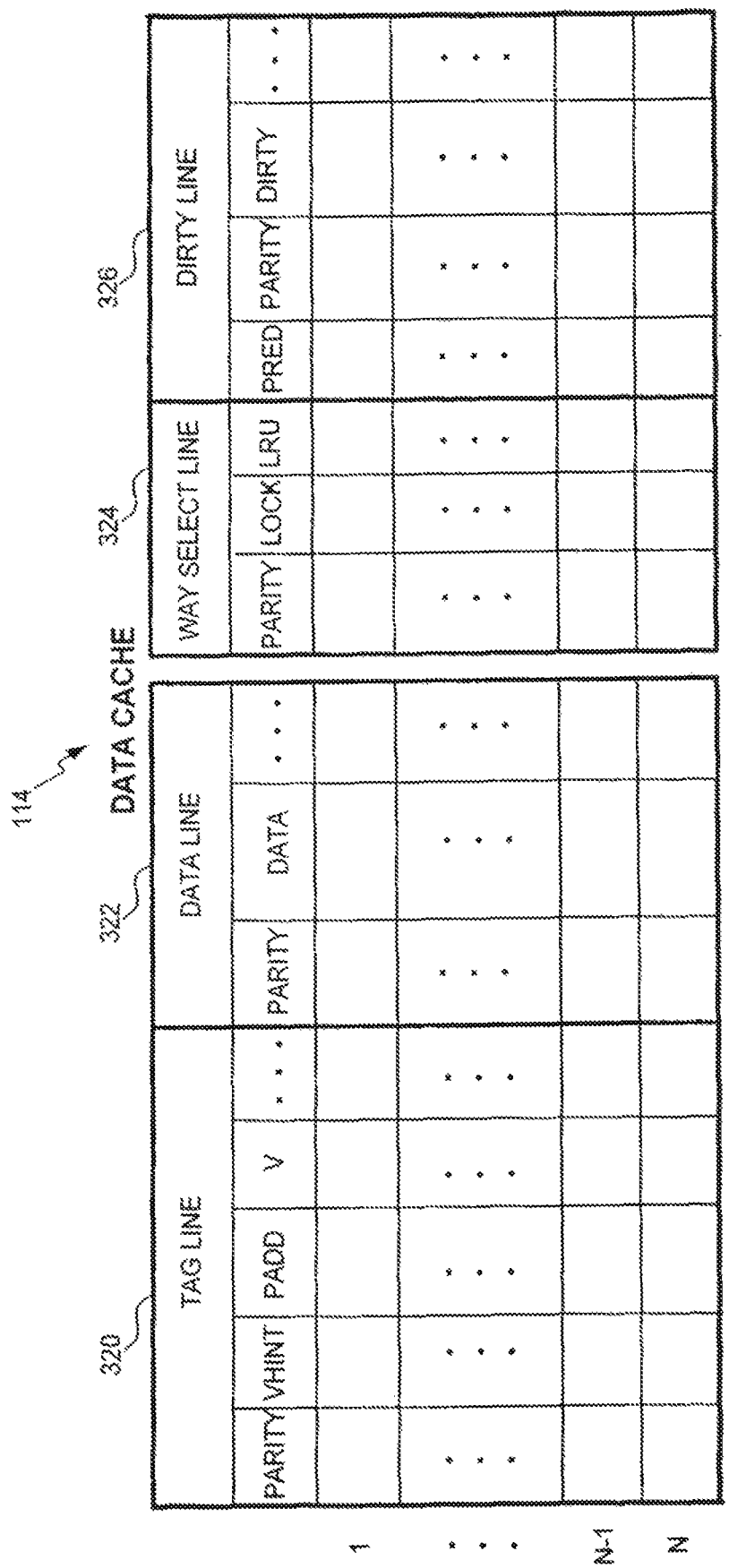
FIG. 3E illustrates an example data cache according to an embodiment of the present invention.

FIG. 3E illustrates an example data cache 114 according to an embodiment of the present invention. Data cache 114 is preferably a multi-set associative cache that is configurable, for example, as a 16 KB, 32 KB or 64 KB cache depending on the number of sets or ways. Each cache way includes a tag ram and a data ram.

In an embodiment of the present invention, each tag ram entry stores tag line (TAG LINE) information 320. Tag line information 320 includes (but is not limited to) a parity (PARITY) value, a virtual hint or address (VHINT) tag value, a physical address (PADD) tag value, and a valid (V) value. The parity value is optional. The virtual hint (address) tag value comprises a selected number of the most significant bits of a virtual address. In an embodiment, the number of most significant bits used is equal to the total number of virtual address bits minus the number of least significant bits used as an index value to data cache 114. In one embodiment, virtual address bits [31:12] are used. The physical address tag value also comprises a selected number of the most significant bits of a physical address. In an embodiment, bits [31:12] of a physical address are used. The tag ram is line width writable.

In an embodiment of the present invention, each data ram entry stores data line (DATA LINE) information 322. Data line information 322 includes a parity (PARITY) value and a data (DATA) value. The parity value is optional. In an embodiment, each data value is 32 bytes wide and is byte writable. The read granularity is 64 bits.

For all the ways corresponding to an index entry in data cache 114, there is a corresponding way select line (WAY SELECT LINE) 324 and a corresponding dirty line (DIRTY LINE) 326.

The way select lines 324 are stored in a way select array. Each way select line 324 includes a parity (PARITY) value, a lock (LOCK) value, and a least recently used (LRU) value. The parity value is optional. In an embodiment, the lock value includes one bit for each way to indicate which ways, if any, are locked. The least recently used value indicates which way to select for eviction. The least recently used values of the way select array are updated for loads and stores that hit in data cache 114. The way select array is bit writable.

The dirty lines 326 are stored in a dirty array. Each dirty line 326 includes a way prediction (PRED) value, a parity (PARITY) value, and a dirty (DIRTY) value. Dirty lines 326 maintain the dirty status of each data ram way of data cache 114. In an embodiment, the dirty value of each dirty line stores one dirty status bit for each way and is bit writable. The prediction value stores an alias way prediction that is used to identify virtual address synonyms and retrieve needed data from data cache 114.

In an embodiment of the present invention, processor 100 implements a virtual hint based way prediction scheme that allows data from data cache 114 to be retrieved from data cache 114 and provided to dependent instructions before a physical address for the data is available. The scheme is implemented as follows. Each cache line of data cache 114 is tagged with both a virtual hint (address) value and a physical address value. A virtual address for required data is compared to the virtual hint value stored in the tag rams. If a match occurs, the matching way's data is forwarded to an appropriate execution unit 102 such as, for example, integer execution unit 118. In a subsequent processor clock cycle, after the physical address is available, the physical address is compared to the tag ram physical tag values to verify that the correct data was forwarded. If the correct data was forwarded, a hit is signaled to the execution unit and the graduation unit, and no further action is required. If the correct data was not forwarded, a miss is signaled to the execution unit and the graduation unit, and any instruction that operated on the incorrect data is invalidated and/or replayed. When the instruction is replayed, it is provided with the correct data. This scheme thus enables virtual address tags to be used to generate early cache way predictions that are backed up in subsequent processor clock cycles with physical address compares.

In an embodiment of the present invention, when no match occurs between the virtual hint values and a virtual address, an alias way is returned. The alias way is an extra prediction about where the required data is physically available in data cache 114 (e.g., at an alias address). This extra prediction or alias way is the prediction value stored in the dirty array. During initialization of the cache, the alias way defaults to a selected way such as, for example, way zero. After initialization of the data cache, the alias way is kept up to date with the hit way of the last cache line with a synonym. In an embodiment, the update of an alias way prediction occurs when a pointer to an instruction reaches the top of load/store graduation buffer 204. As with data forwarded based on a virtual hint match, the correctness of data forwarded based on an alias way prediction is backed up with a physical address compare. If the correct data was forwarded based on the alias way prediction, a hit is signaled to the execution unit(s) and the graduation unit, and no further action is required. If the correct data was not forwarded, a miss is signaled to the execution unit(s) and the graduation unit, and any instruction that operated on the incorrect data is invalidated and/or replayed. When the instruction is replayed, it is provided with the correct data.

Figure 4A:
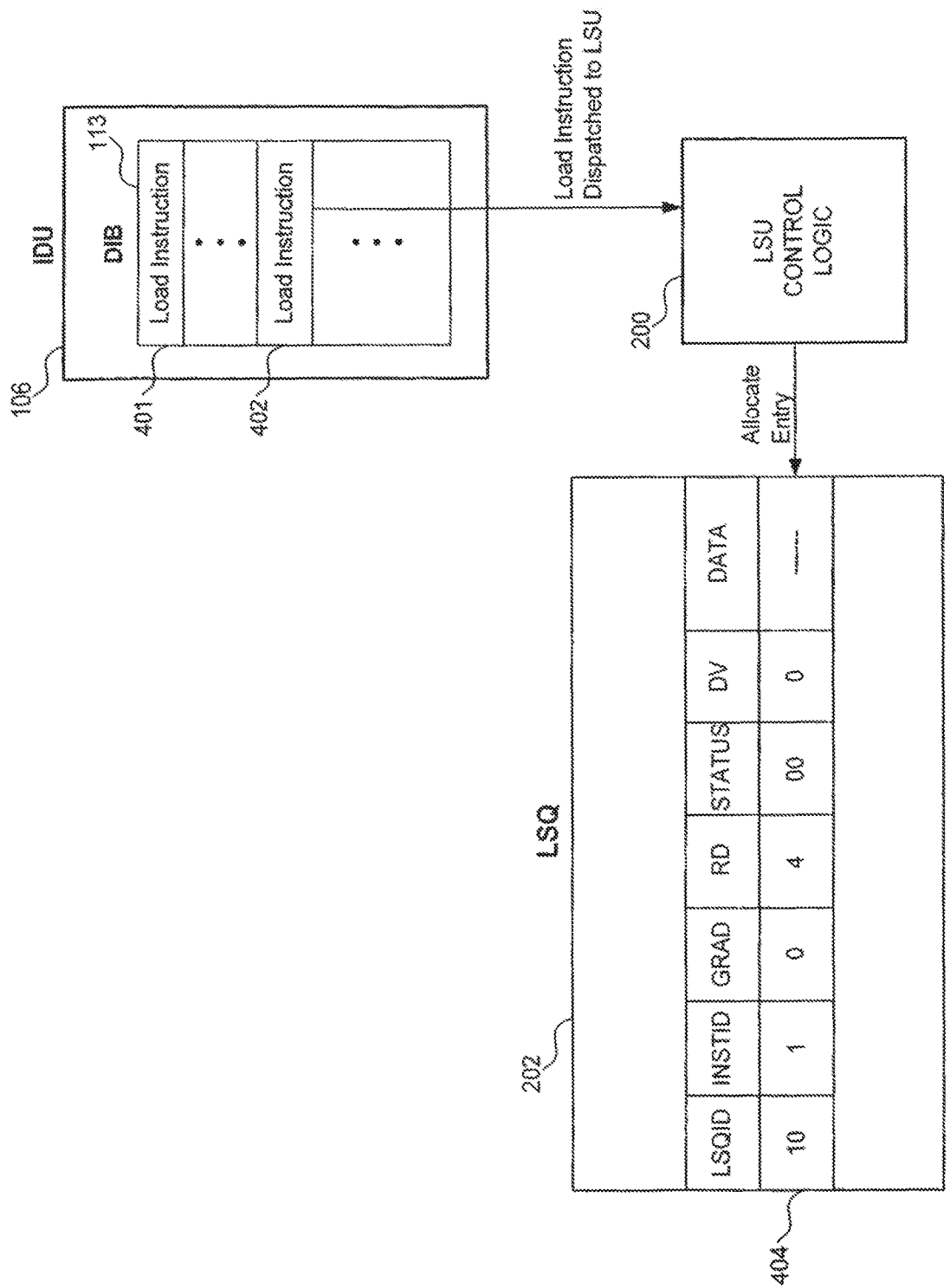
FIG. 4A illustrates allocation of an entry in a load/store queue.

FIG. 4A illustrates an example of how an entry in load/store queue 202 is allocated according to an embodiment of the present invention. The example illustrated in FIG. 4A begins with the dispatch of an instruction 402 from decoded instruction buffer 113 of instruction dispatch unit 106 to load/store unit 108. Instruction 402 is dispatched to load/store unit 108 out-of-program-order.

Load/store unit control logic 200 in load/store unit 108 receives instruction type information for instruction 402 (for purposes of this example, instruction 402 is a load instruction) and calculates a virtual address for the required load data. As shown in FIG. 4A, load/store unit control logic 200 allocates entry 404 in load/store queue 202 for storing information associated with instruction 402.

As shown in FIG. 4A, instruction 402 is assigned a load/store queue identification value of ten. The instruction identification value for instruction 402 is one. The instruction identification value is used to indicate the "age" or program order of instruction 402 relative to other program instructions. In an embodiment, an instruction with a higher instruction identification value follows in program order an instruction with a lower instruction identification value. The graduation value in load/store queue 202 is reset to zero because the instruction has not yet graduated. The register destination value is set to four, thereby indicating that register R4 in register file 130 is the destination register that will eventually store the result of load instruction 402. The least signification bit of the status field is set to zero to indicate that the load is a miss. The most significant bit of the status field is set to zero to indicate that the value to be loaded is not present in data cache 114. The data valid field is set to zero to indicate that due to the load miss there is no valid data present in the data field.

Figure 4B:
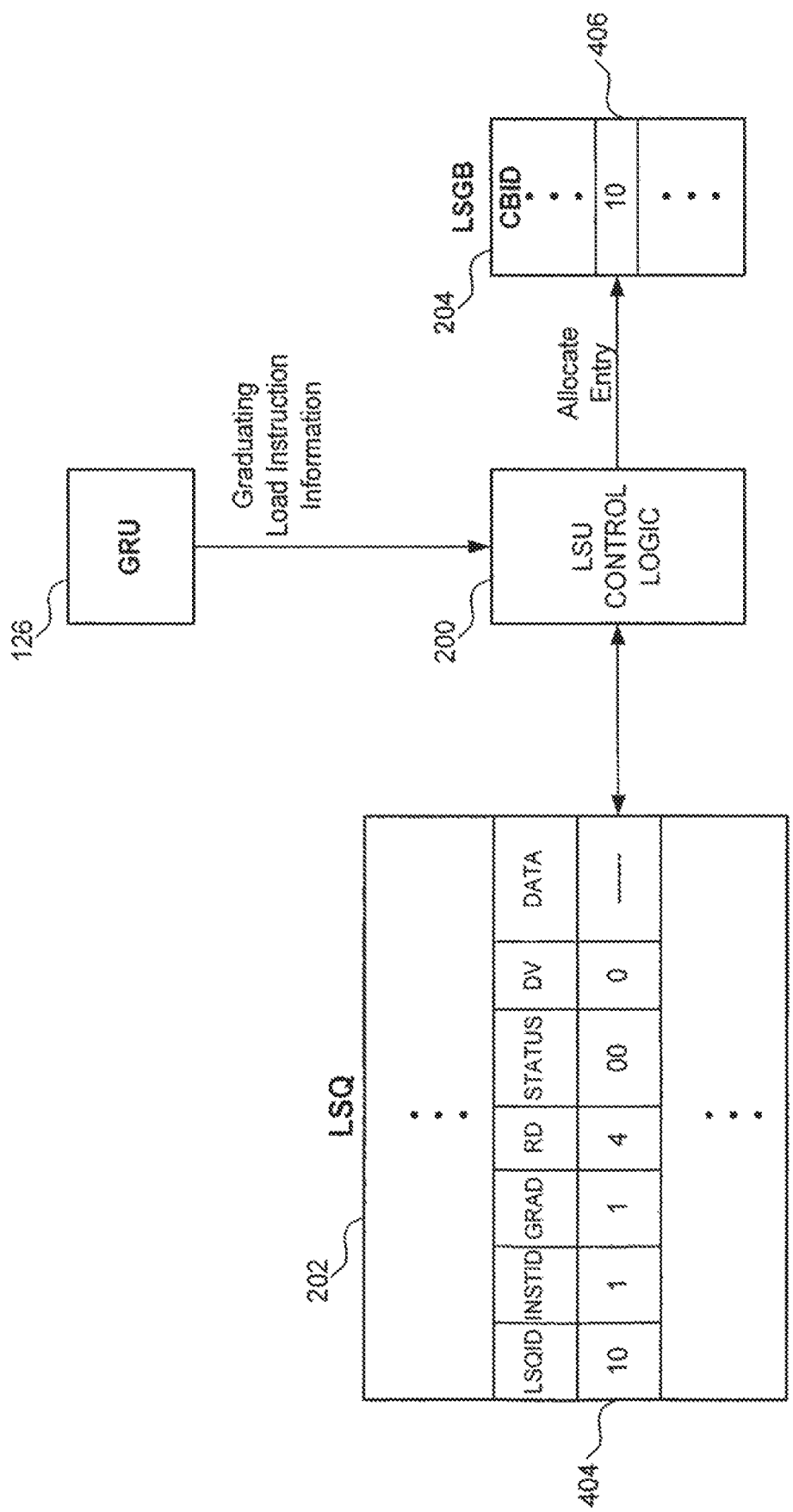
FIG. 4B illustrates graduation of an instruction and allocation of an entry in a load/store graduation buffer.

FIG. 4B continues the example of FIG. 4A. FIG. 4B illustrates the graduation of instruction 402 and the allocation of an entry 406 in load/store graduation buffer 204 that holds a pointer to entry 404 of load/store queue 202. As described herein, graduation unit 126 graduates load instruction 402 in program order.

Upon graduation of load instruction 402, graduation unit 126 broadcasts a signal that communicates the instruction identification value (10) and the register destination value (4) for instruction 402. Based on the instruction identification value, load/store unit control logic 200 reads entry 404 corresponding to instruction 402 in load/store queue 202 and determines the status of load instruction 402. Because instruction 402 is associated with a load miss, load/store unit control logic 200 allocates entry 406 in load/store graduation buffer 204 to hold a pointer (10) to entry 404 in load/store queue 202. In the example shown, the load/store queue identification value is the same as the completion buffer identification value assigned to instruction 402 during instruction decode and dispatch.

As shown in FIG. 4B, load/store unit control logic 200 updates the graduation value in entry 404 of load/store queue 202 to one to indicate that instruction 402 has graduated. If the required load data becomes available in data cache 114, for example, due to a store instruction, the most significant bit of the status field in load/store queue 202 will be updated to one to indicate that the required data is available. This change in status also indicates that a probe needs to be sent to data cache 114 to retrieve the required data.

Figure 4C:
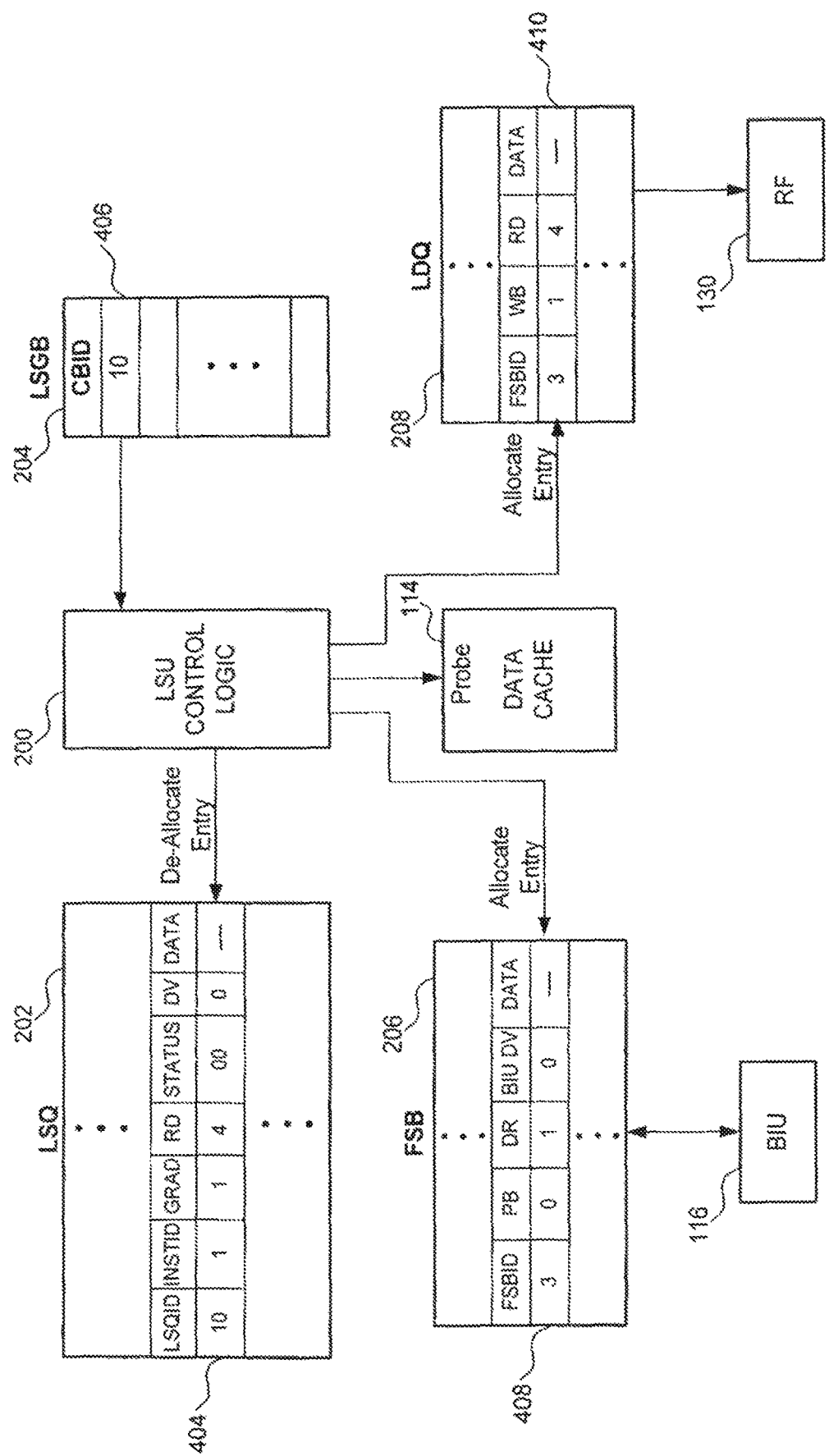
FIG. 4C illustrates allocation of entries in a fill/store buffer and in a load data queue and de-allocation of an entry in a load/store queue.

FIG. 4C illustrates an allocation of entry 408 in fill/store buffer 206 and allocation of entry 410 in load data queue 208. FIG. 4B also shows the de-allocation of entry 404 in load/store queue 202. These actions are taken in response to the pointer 10 (stored in entry 406 of load/store graduation buffer 204) reaching the top of load/store graduation buffer 204 and being serviced. An instruction associated with a pointer in load/store graduation buffer 204 is serviced when the pointer reaches the top of load/store graduation buffer 204.

Based on the information stored in load/store queue 202 for an instruction, load/store unit control logic 200 may allocate an entry in load data queue 208 for the instruction, allocate an entry in fill/store buffer 206 for the instruction and/or send a probe to data cache 114. For the example shown in FIG. 4C, the status value indicates the load data required for instruction 402 is in memory located outside of processor 100. Thus, the required data will have to be requested using bus interface unit 116. Because fill/store buffer 206 is used to request data from bus interface unit 116, an entry 408 is allocated in fill/store buffer 206 along with an entry 410 in load data queue 208 for instruction 402.

In a situation where the required load data becomes available in data cache 114 by the time an instruction associated with a pointer in load/store graduation buffer 204 is serviced, all that is required is to allocate an entry in load data queue 208 for the instruction and to send a probe to data cache 114 to retrieve the data. No entry is required in fill/store buffer 206 because the required data will be forwarded to load data queue 208 from data cache 114.

In a situation where required data is available in an entry of fill/store buffer 206, the required data is forwarded by fill/store buffer 206 to load/store queue 202 and/or load data queue 208 without the need to allocate an entry in fill/store buffer 206. If an entry in fill/store buffer 206 has been allocated, load/store unit control logic 200 stores the fill/store buffer identification value (e.g., the value three shown in entry 408) in a corresponding entry of load data queue 208 (e.g., entry 410) as a pointer between fill/store buffer 206 and load data queue 208.

When the required data for instruction 402 is returned from bus interface unit 116, the bus interface unit 116 data valid (BIU DV) bit is set to one, and the data is forwarded to entry 410 of load data queue 208 (e.g., using the FSBID as an index into load data queue 208 to indicate where the data should be stored). After load data queue 208 receives the missing load data for instruction 402, it writes-back the data to the register indicated by the register destination (RD) value if and only if the write-back (WB) value is set to one.

In an embodiment of the present invention, after the entries for instruction 402 have been allocated in load data queue 208 and fill/store buffer 206, entry 404 in load/store queue 202 and entry 406 in load/store graduation buffer 204 are de-allocated by load/store unit control logic 200 to create space for other instructions. In an embodiment, de-allocation of entries 404 and 406 may require a few processor clock cycles, and during this period, entries 404, 406, 408 and 410 may exist simultaneously.

FIG. 5A illustrates detection of a write-after-write hazard according to an embodiment of the present invention. When graduation unit 126 broadcasts graduation of a load instruction 401 (which follows instruction 402 in program order), load/store unit control logic 200 compares the register destination value of load instruction 401 with the register destination values of any graduated load instruction entry stored in load/store queue 202 and/or load data queue 208. To determine whether an instruction associated with an entry in load/store queue 202 has graduated, its graduation bit is checked in load/store queue 202. If the graduation bit of an entry in load/store queue 202 is set to one, and if the associated instruction register destination value for the graduated instruction matches that of graduating load instruction 401, a write-after-write hazard exists because the older graduated load instruction may overwrite the value written by load instruction 401 in register file 130 (e.g., assuming that instruction 401 is not associated with a data miss).

In the example shown in FIG. 5A, the register destination value in entries 404 and 410 match the register destination value broadcast by graduation unit 126 for load instruction 401. Thus, comparators 500a and 500b are shown outputting a match signal to load/store unit control logic 200, which indicates the detection of a write-after-write hazard. In an embodiment, a match signal value equal to one indicates a match, and a match signal value equal to zero indicates no match.

FIG. 5B illustrates how load/store unit control logic 200 prevents a detected write-after-write hazard from occurring according to an embodiment of the present invention. As shown in FIG. 5B, after detecting that a write-after-write hazard exists if instruction 402 writes-back to register file 130, load/store unit control logic 200 prevents the hazard from occurring by setting the register destination value in entry 404 of load/store queue 202 to a value that corresponds to a read-only register (e.g., register R0 in register file 130), and by setting the write-back value in entry 410 of load data queue 208 to zero. As described above, setting the write-back value to zero in entry 410 of load data queue 208 prevents data stored in load data queue 208 from being written back to register file 130.

It is to be appreciated that even though entries for instruction 402 are shown in load/store queue 202 and load data queue 208, in a first instance, only entry 404 may be present in load/store queue 202 because load/store graduation buffer 204 may not have yet allocated load data queue 208 entry 410. In a second instance, only entry 410 may be present because entry 404 may have been de-allocated. As noted above, it is possible that both entry 404 and entry 410 may be present (as shown) until entry 404 is de-allocated by load/store unit control logic 200. In the event that only entry 404 is present, only the register destination value for entry 404 is set to zero. In the event that only entry 410 is present, only the write-back value for entry 410 is set to zero. In the event both entries 404 and 410 are present, then as described above, both the register destination value for entry 404 is set to zero and the write-back value for entry 410 is set to zero.

FIGS. 5C1 and 5C2 further illustrate how write-after write hazards are detected according to an embodiment of the present invention. As shown in FIGS. 5C1 and 5C2, graduation unit 126 broadcasts information for a graduating load instruction. The broadcast includes the register destination value for the graduating instruction. This value is compared to register destination values stored in load/store queue 202 for previously graduated instructions using comparators 502. Any matches are communicated to load/store unit control logic 200. Similarly, the broadcast register destination value for the graduating instruction is compared to register destination values stored in load data queue 208 using comparators 508, and any matches are communicated to load/store unit control logic 200. The operations depicted in FIGS. 5C1 and 5C2 preferably occur in parallel.

FIG. 5D illustrates how write-after-write hazards detected in FIGS. 5C1 and 5C2 are prevented according to an embodiment of the present invention. As shown in FIG. 5D, upon detecting write-after-write hazards, for example, due to entries in load/store queue 202 and/or entries in load data queue 208, load/store unit control logic 200 prevents the hazards from occurring. As shown in FIG. 5D, load/store unit control logic 200 sets register destination values for entries in load/store queue 202 identified as potentially causing a write-after-write hazard to a value associated with a read-only register. Similarly, load/store unit control logic 200 sets the write-back bits for entries in load data queue 208 identified as potentially causing a write-after-write hazard to a value (e.g., zero) that prevents write-back of the data associated with the write-back values. Means other than those described herein can be used to prevent the occurrence of a write-after-write hazard.

FIG. 6 is a diagram of an example system 600 according to an embodiment of the present invention. System 600 includes a processor 602, a memory 604, an input/output (I/O) controller 606, a clock 608, and custom hardware 610. In an embodiment, system 600 is a system on a chip (SOC) in an application specific integrated circuit (ASIC).

Processor 602 is any processor that includes features of the present invention described herein and/or implements a method embodiment of the present invention. In one embodiment, processor 602 includes an instruction fetch unit, an instruction cache, an instruction decode and dispatch unit, one or more instruction execution unit(s), a data cache, a register file, and a bus interface unit similar to processor 100 described above.

Memory 604 can be any memory capable of storing instructions and/or data. Memory 604 can include, for example, random access memory and/or read-only memory.

Input/output (I/O) controller 606 is used to enable components of system 600 to receive and/or send information to peripheral devices. I/O controller 606 can include, for example, an analog-to-digital converter and/or a digital-to-analog converter.

Clock 608 is used to determine when sequential subsystems of system 600 change state. For example, each time a clock signal of clock 608 ticks, state registers of system 600 capture signals generated by combinatorial logic. In an embodiment, the clock signal of clock 608 can be varied. The clock signal can also be divided, for example, before it is provided to selected components of system 600.

Custom hardware 610 is any hardware added to system 600 to tailor system 600 to a specific application. Custom hardware 610 can include, for example, hardware needed to decode audio and/or video signals, accelerate graphics operations, and/or implement a smart sensor. Persons skilled in the relevant arts will understand how to implement custom hardware 610 to tailor system 600 to a specific application.

While various embodiments of the present invention have been described above, it should be understood that they have been presented by way of example, and not limitation. It will be apparent to persons skilled in the relevant computer arts that various changes can be made therein without departing from the scope of the present invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code and/or instructions disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), hardware description languages (HDL) including Verilog HDL, VHDL, SystemC Register Transfer Level (RTL) and so on, or other available programs, databases, and/or circuit (i.e., schematic) capture tools. Such software can be disposed in any known computer usable medium including semiconductor, magnetic disk, optical disk (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence.

The invention claimed is:

1. A method for processing memory access instructions in a processor that executes instructions out-of-program-order, comprising:
    storing a completion buffer identification value for a graduating memory access instruction in a load/store graduation buffer;
    using bits of the stored completion buffer identification value to access an entry of a load/store queue associated with the instruction;
    retrieving information from the load/store queue entry; and
    determining whether to allocate an entry for the instruction in a fill/store buffer based on the retrieved information.

2. The method of claim 1, further comprising:
    allocating an entry for the instruction in the fill/store buffer.

3. The method of claim 2 comprising:
    deallocating the entry of the load/store queue associated with the instruction.

4. The method of claim 2, further comprising:
    requesting, using the fill/store buffer, data required for the instruction from the bus interface unit.

5. The method of claim 1, wherein the retrieving step comprises:
    retrieving information about whether data to be loaded in to a register of the processor is available in a data cache.

6. The method of claim 1, further comprising:
    determining whether to allocate an entry for the instruction in a load data queue based on the retrieved information.

7. The method of claim 5, further comprising:
    allocating an entry for the instruction in the load data queue;
    storing, using the control logic, an identification value in the entry for the instruction in the load data queue as a pointer between the fill/store buffer and load data queue.

8. A processor that executes instructions out-of-program-order, comprising:
    a load/store queue that includes a plurality of entries, each entry of the load/store queue to store information associated with a respective memory access instruction during execution;
    a load/store graduation buffer that includes a plurality of entries, each entry of the load/store graduation buffer to store a pointer to a corresponding entry of the load/store queue;
    a fill/store buffer that includes a plurality of entries, each entry of the fill/store buffer to store information for a corresponding memory access instruction; and
    control logic coupled to the load/store queue, the load/store graduation buffer, and the fill/store buffer and when a pointer in the load/store graduation buffer is serviced and data is not available for the memory access instruction corresponding to the serviced pointer, the control logic is to:
        allocate a first entry in the fill/store buffer for the memory access instruction corresponding to the serviced pointer.

9. The processor of claim 8, wherein the first entry is allocated due to a load or store cache miss.

10. The processor of claim 8, wherein the fill/store buffer is to request data for the memory access instruction using a bus interface unit.

11. The processor of claim 8, wherein when required data for the memory access instruction is available in an entry of the fill/store buffer, the fill/store buffer is to forward the data to one or more of:
    the load/store queue; a cache; and a load data queue.

12. The processor of claim 8, wherein the control logic is to deallocate an entry in the load/store queue for the instruction corresponding to the serviced pointer.

13. The processor of claim 8, wherein the control logic is to:
    allocate an entry in a load/data queue for the memory access instruction corresponding to the serviced pointer; and
    store an identification value in the entry of the load data queue as a pointer between the first entry in the fill/store buffer and the entry in the load/data queue for the memory access instruction corresponding to the serviced pointer.

14. The processor of claim 8, wherein the information in each entry of the fill/store buffer includes an identification field; a virtual tag information field; a physical tag information field; and a data field for storing data bits.

15. The processor of claim 14, wherein the virtual tag information includes one or more of:
    a thread context identification value; a virtual address value; a data request value; and a data cache probe request value.

16. The processor of claim 14, wherein the physical tag information includes one or more of:
    a physical address value; and a bus interface unit data returned value.

17. The processor of claim 8, wherein the fill/store buffer is flushed on a per thread basis and compacted to remove flushed out entries.

18. A tangible computer readable storage medium that includes a processor embodied in software, the processor comprising:
    a load/store queue that includes a plurality of entries, each entry of the load/store queue to store information associated with a respective memory access instruction during execution;
    a load/store graduation buffer that includes a plurality of entries, each entry of the load/store graduation buffer to store a pointer to a corresponding entry of the load/store queue;

a fill/store buffer that includes a plurality of entries, each entry of the fill/store buffer to store information for a corresponding memory access instruction; and control logic coupled to the load/store queue, the load/store graduation buffer, and the fill/store buffer and when a pointer in the load/store graduation buffer is serviced and data is not available for the memory access instruction corresponding to the serviced pointer, the control logic is to:

allocate a first entry in the fill/store buffer for the memory access instruction corresponding to the serviced pointer.

19. The tangible computer readable storage medium of claim 18, wherein the processor is embodied in hardware description language software.

20. The tangible computer readable storage medium of claim 18, wherein the processor is embodied in one of Verilog hardware description language software and VHDL hardware description language software.

* * * * *